(12) United States Patent
Koerner et al.

(10) Patent No.: US 8,934,104 B2
(45) Date of Patent: Jan. 13, 2015

(54) METHOD AND ARRANGEMENT FOR ROBUST INTERFEROMETRY FOR DETECTING A FEATURE OF AN OBJECT

(75) Inventors: Klaus Koerner, Berlin (DE); Reinhard Berger, Lorch (DE); Wolfgang Osten, Stuttgart (DE)

(73) Assignee: Universitaet Stuttgart, Stuttgart (DE)

( * ) Notice: Subject to any disclaimer, the term of this patent is extended or adjusted under 35 U.S.C. 154(b) by 262 days.

(21) Appl. No.: 13/574,707

(22) PCT Filed: Jan. 21, 2011

(86) PCT No.: PCT/EP2011/000248
§ 371 (c)(1),
(2), (4) Date: Aug. 17, 2012

(87) PCT Pub. No.: WO2011/089010
PCT Pub. Date: Jul. 28, 2011

(65) Prior Publication Data
US 2012/0307258 A1 Dec. 6, 2012

(30) Foreign Application Priority Data
Jan. 22, 2010 (DE) .......... 10 2010 006 239

(51) Int. Cl.
*G01B 11/02* (2006.01)
*G01B 9/02* (2006.01)

(52) U.S. Cl.
CPC .......... *G01B 9/0209* (2013.01); *G01B 9/02061* (2013.01); *G01B 2290/15* (2013.01)
USPC .......................................... 356/497; 356/520

(58) Field of Classification Search
CPC ............. G01B 9/0209; G01B 9/02098; G01B 9/02097; G01B 9/02061; G01B 2290/15; G01B 9/02091; A61B 5/0066; A61B 5/0073; A61B 3/102; G01N 21/4795; G01N 2021/1787
USPC .................................................. 356/450–521
See application file for complete search history.

(56) References Cited

U.S. PATENT DOCUMENTS 1,565,533 A   11/1923  Twyman et al.
4,643,576 A    2/1987  Kanoh et al.
(Continued)

FOREIGN PATENT DOCUMENTS

DE   10321886 A1 * 12/2004   ............. G01B 11/24
DE   10321887 A1 * 12/2004   ............. G01B 11/24
(Continued)

OTHER PUBLICATIONS

International Preliminary Report on Patentability, 2010.
(Continued)

*Primary Examiner* — Kara E Geisel
*Assistant Examiner* — Violeta A Prieto
(74) *Attorney, Agent, or Firm* — Gerald E. Hespos; Michael J. Porco; Matthew T. Hespos

(57) ABSTRACT

An arrangement and a method are provided for robust interferometry for detecting distance, depth, profile, form, undulation, flatness deviation and/or roughness or the optical path length in or on technical or biological objects, including in layered form, or else for optical coherence tomography (OCT), with a source of electromagnetic radiation and with an interferometer, in particular also in the form of an interference microscope, having an object beam path and having a reference beam path, in which an end reflector is arranged, and a line-scan detector for detecting electromagnetic radiation in the form of at least one spatial interferogram.

15 Claims, 19 Drawing Sheets

(56) References Cited

U.S. PATENT DOCUMENTS

| | | | |
|---|---|---|---|
| 6,046,792 A * | 4/2000 | Van Der Werf et al. | 355/53 |
| 6,762,845 B2 * | 7/2004 | Hill | 356/520 |
| 6,791,693 B2 * | 9/2004 | Hill | 356/500 |
| 6,806,960 B2 * | 10/2004 | Bagwell et al. | 356/487 |
| 6,847,452 B2 * | 1/2005 | Hill | 356/450 |
| 7,046,370 B2 * | 5/2006 | Carlson | 356/493 |
| 7,193,726 B2 * | 3/2007 | Hill | 356/520 |
| 7,292,346 B2 * | 11/2007 | De Groot et al. | 356/496 |
| 7,327,465 B2 * | 2/2008 | Hill | 356/498 |
| 7,330,274 B2 * | 2/2008 | Hill | 356/498 |
| 2003/0227681 A1 * | 12/2003 | Currie | 359/529 |
| 2008/0198386 A1 * | 8/2008 | Hirata et al. | 356/491 |

FOREIGN PATENT DOCUMENTS

| | | |
|---|---|---|
| DE | 10 2006 015 387 | 10/2007 |
| WO | 03/019110 | 3/2003 |

OTHER PUBLICATIONS

Marco Hering et al.—"Correlated speckle noise in white-light interferometry: theoretical analysis of measurement uncertainty"—Applied Optics, vo. 48, No. 3, pp. 525-538, Jan. 2009.

M. Hering et al.—"One-Shot Line-Profiling White Light Interferometer with Spatial Phase Shift for Measuring Rough Surfaces"—Proceedings of SPIE, vol. 6188, 61880E-1-61880E-11 in Figure 7, 2006.

D. Malacara—"Optical Shop Testing"—John Wiley & Sons, Inc., 1992, pp. 140-141, Figure 4.16.

W.H. Steel—"Interferometry"—Cambridge University Press, 1967, p. 83 last paragraph to top of p. 84.

D. Kelsall—"Optical Frequency Response Characteristics in the presence of Spherical Aberration measured by an automatically recording Interferometric Instrument"—Proc. Phys. Society, 73, 1959, pp. 465-479.

* cited by examiner

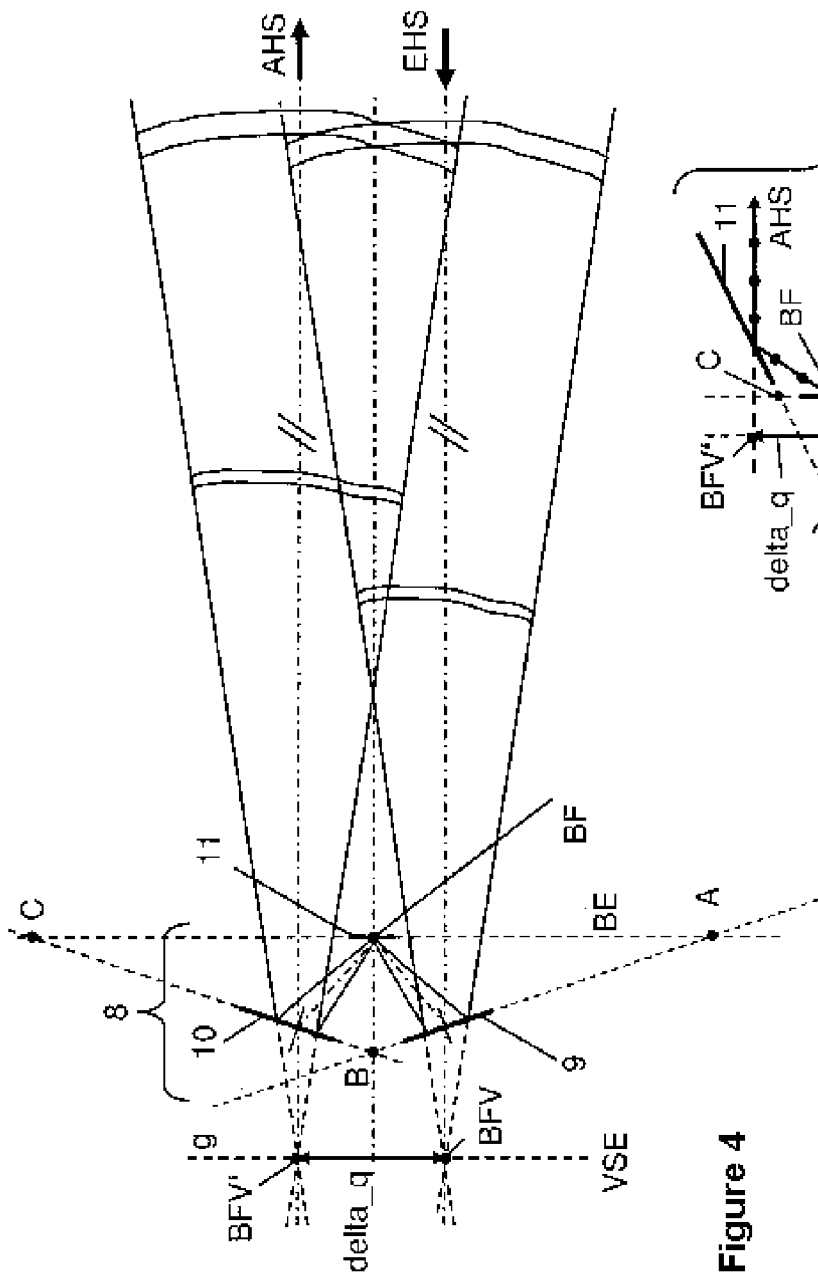
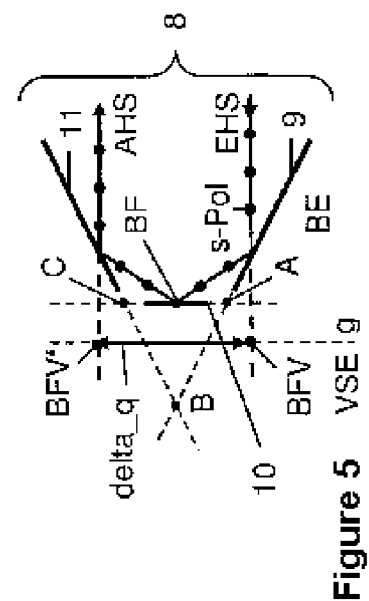
Figure 4
Figure 5

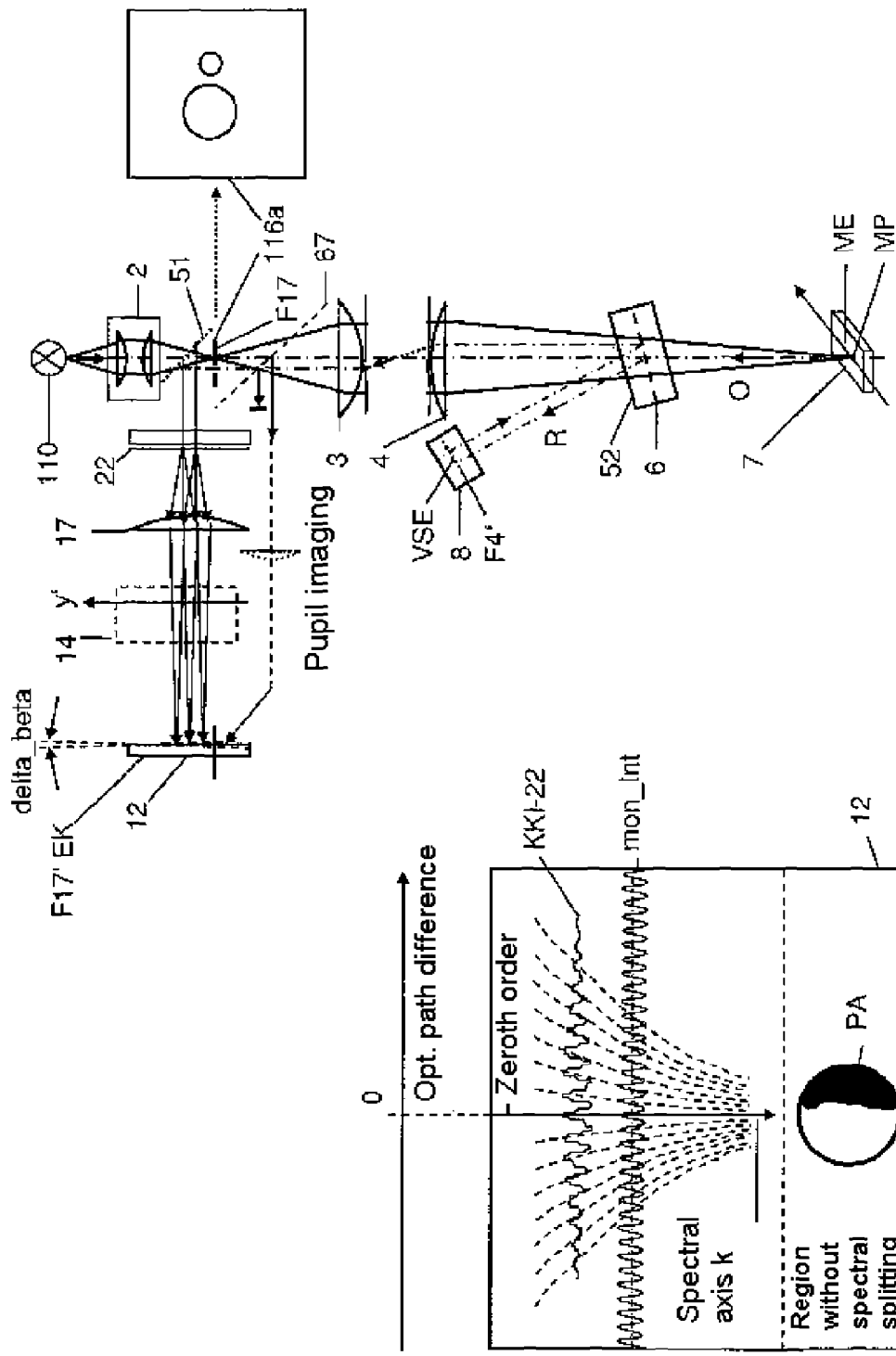

METHOD AND ARRANGEMENT FOR ROBUST INTERFEROMETRY FOR DETECTING A FEATURE OF AN OBJECT

BACKGROUND OF THE INVENTION

1. Field of the Invention

The published patent application DE 10 2006 015 387 A1 by M. Hering et al. discloses an interferometric measuring device on the basis of white light interferometry, also known as short-coherence interferometry, wherein the wavefronts of the reflected object ray and those of the reflected reference ray are inclined with respect to one another by a specific angular magnitude by means of an inclination device, such that a spatial interferogram can arise as a single-shot data set. By way of example, said angular magnitude is realized here in a greatly modified Linnik interferometer arrangement, which also has features of a Mach-Zender interferometer, by means of a tilting mirror through which light passes only once on the path to detection. In this case, the tilting mirror disposed downstream of the Linnik arrangement, is situated in an infinite beam path for the object light and is still part of the interferometer.

2. Description of the Related Art

By means of the measuring method on the basis of this optical arrangement, one or a plurality of spatial interferograms, also as line stacks on a matrix camera, can be made available completely as single-shot data sets in the time duration of an image recording.

In this approach with the tilting mirror in the infinite beam path, what is particularly advantageous is that the spatial frequency for the centroid wavelength, or the centroid wavenumber, in the spatial interferogram at the output of the interferometer is, to a first approximation, not influenced by the inclination of the object surface in relation to the interferometer. This invariance of the spatial frequency constitutes a great advantage for the evaluation of spatial interferograms.

However, said downstream inclination device described in DE 10 2006 015 387 A1 is complex—including in terms of alignment—and generally very susceptible to undesirable misalignments and, consequently, the interferometer generally also does not exhibit long-term stability. Thus, the signal waveform of a short-coherent spatial interferogram can also change in an unknown manner, which can constitute a considerable disadvantage for the evaluation.

A targeted change in the angular magnitude by means of an inclination device, for example in order to change the spatial frequency for the centroid wavelength in the spatial interferogram in a predetermined manner, can lead to an undesired lateral offset of object wavefront and reference wavefront during detection, which can be compensated for only in a complex manner or cannot be compensated for at all by an alignment in some cases. Thus, the possibility of changing the spatial frequency for the centroid wavelength in the spatial interferogram in a simple manner is greatly restricted in the case of this arrangement. Furthermore, in the case of a sub-optimal alignment of the very complex interferometer, an only partial lateral overlap of object wavefront and reference wavefront can occur permanently, which can constitute a source of measurement errors or can considerably restrict the depth measurement range since the interference effect disappears when there is a lack of superimposition. In particular, this approach does not enable measurement in a larger depth measurement range than that addressed by means of a single spatial interferogram.

In the publication by M. Hering et al. in Applied Optics, vol. 48, number 3, pages 525 to 538 on 20 Jan. 2009, the measured spatial interferograms in FIG. 3 show the potential of this approach in accordance with DE 10 2006 015 387 A1. The interferometric one-shot measuring arrangement presented in FIG. 1 represents an experimental set-up for study purposes and for economic implementation is rather too complex and too bulky and also very complex in respect of alignment. The optical principle necessitates that in this case the technical and structural measures for achieving a high mechanical stability and temperature stability are very complex. Typical measurement results on the basis of this approach had already been presented by M. Hering et al. in 2006 in the Proceedings of SPIE, vol. 6188, 61880E-1 to 61880E-11 in FIG. 7.

Obtaining spatial interferograms for one-shot metrology, for example for measuring distance or profile, by means of an inclination device in the form of a plane tilting mirror in the interferometer, wherein said mirror is, however, always situated outside the object-imaging and also outside the focused reference beam path, that is to say in an infinite beam path, is regarded as the prior art to be taken into consideration here.

In the case of this principle, the inclination of an object surface with respect to the interferometer advantageously does not lead to a change in the spatial frequency for the centroid wavelength, or the centroid wavenumber, in a spatial interferogram. However, the interference contrast can approach the value zero even when the object surface is tilted slightly.

A comparatively high interference contrast in the detected spatial interferogram can be achieved by means of a comparatively large tilting angle range of the object surface only when said object surface is illuminated by means of an optical system with high numeral aperture and with laterally almost diffraction-limited focal points or focused line images.

By contrast, Michelson-type interferometers having a plane reference mirror, wherein the spatial frequency for the centroid wavelength in a spatial interferogram at the output of the interferometer is to be changed by tilting the reference mirror or by tilting the object with respect to the interferometer or the interferometer with respect to the object, for measurement objects having varying and unknown surface inclination, are not of interest here with regard to the evaluation of spatial interferograms. Therefore, approaches on this basis are not regarded as prior art with respect to this invention and, therefore, nor will they be considered further here.

Obtaining spatial interferograms for one-shot metrology by means of lateral shear between object and reference wavefronts at the output of a two-beam interferometer constitutes, in principle, a further possibility of generating spatial interferograms for one-shot metrology, for example for detecting distance. This is because lateral shear can be used in an optical arrangement as a basis for generating interferences of wavefronts inclined with respect to one another. One entirely traditional approach in this regard is a Michelson interferometer arrangement having two roof edge reflectors in order to generate the required lateral shear. This approach with two roof edge reflectors is generally used for wavefront analysis and is well known to those skilled in the art, also see D. Malacara, Optical Shop Testing, John Wiley & Sons Inc., 1992, pages 140-141, FIG. 4.16 and also W. H. Steel, Interferometry, Cambridge University Press, 1967 page 83 last paragraph to top of page 84.

In order to be able to use this interferometer approach with two roof edge reflectors for distance measurement and profile measurement, in the object beam path of the interferometer an additional plane mirror accordingly has to be assigned to the object surface, wherein said plane mirror together with the object surface then forms a roof edge. In this case, the second roof edge reflector is arranged in the reference beam path. This arrangement, with corresponding alignment, yields lateral shear, avoids wavefront inversion, but generally has distinct disadvantages owing to the structural volume in the object beam path, that is to say with regard to accessibility to the object, for example in the case of measurement in interior spaces.

Also known is the approach published by D. Kelsall in 1959 in Proc. Phys. Society, 73, page 470, FIG. 1, with two triple reflectors as end reflectors of a Michelson interferometer. The lateral displacement of a triple reflector likewise generates a lateral shear between object and reference wavefronts at the output of a Michelson interferometer. To the best of our knowledge indeed the use of a triple reflector in the reference beam path of a Michelson interferometer already goes back, however, to F. Twyman and A. Green, also see U.S. Pat. No. 1,565,533, FIG. 6.

Using this interferometer approach as an arrangement for an interferometric sensor for distance measurement, inter alia, in which a plane mirror of the triple reflector in the form of a corner cube is replaced by the object surface, has the effect that it is also necessary to assign a roof edge reflector or two plane mirrors to the object or to the object surface in the object beam path if the undesired wavefront inversion between object radiation and reference radiation is intended to be avoided. However, this enlarges the sensor volume very considerably, which is very disadvantageous for many applications or this totally precludes the use of such a solution. Moreover, in this case there is no invariance of the lateral shear and thus of the inclination of the interfering wavefronts for example in relation to lateral drifting away of the triple reference reflector or else of the object itself. Thus, the spatial frequency for the centroid wavelength in the spatial interferogram can change, which can be very disadvantageous for the evaluation.

SUMMARY OF THE INVENTION

The aim of the invention is firstly to make available for economic use in particular cost-effective and primarily robust measuring methods, in particular as one-shot metrology, for detecting distance, depth, profile, form, undulation and/or roughness or the optical path length in or on technical or biological objects, including in layered form, in particular including one or more air clearances in optical systems, or else for optical coherence tomography (OCT), in particular also with single-shot multi-point scanning.

Thus, the inventive problem to be solved is therefore that of providing, during optical scanning of the object surface or of an object volume by means of an interferometer, optical signals with a signal waveform that is best suited, that is to say can be evaluated as well as possible, for a punctiform, linear measurement zone or else an areal measurement zone with many individual measurement points, in particular without a mechanical depth scan effected time-serially.

In one aspect, in this case in particular many laterally adjacent object elements or object points are intended to be able to be measured simultaneously. That is to say that the problem addressed, in particular, is that of providing as rapidly as possible optical signals that can be evaluated well during the optical scanning of objects by the method according to the invention and the arrangement (or device) according to the invention by means of an interferometer measuring the object.

In a further aspect, in this case in particular the intention is also to be able to carry out measurement in a larger depth range and/or for larger object distances. That is to say that the problem addressed, in particular, is that of providing optical signal packets that can be evaluated well progressively, that is to say in a plurality of steps—at least in two steps —, during the optical scanning of objects by a method according to the invention.

In this case, the spatial frequency for the centroid wavelength, or the centroid wavenumber, kS in a spatial interferogram is intended to be highly constant or adjustable in a predetermined manner and also highly independent of the inclination of the object surface. In this case, the problem specifically to be solved is that of realizing the absolute value of the inclination of interfering wavefronts that form a spatial interferogram on a detector using simple means, cost-effectively, as far as possible with long-term stability and substantially without variation as a result of ambient influences. The misalignments that typically occur during use of an optical system as a result of a change in the position of components, also as a result of temperature changes in the environment and also as a result of variable mechanical strains, e.g. in the holding elements of the components in the measuring system, are intended to have no or only a comparatively small influence on the absolute value of the inclination of the interfering wavefronts during detection. As is known, that can, of course, only be achieved if the spectrum of the interfering light also remains invariable.

Fields of use for the inventive solution are intended to be: microform and microprofile measurement, measurement of roughness and also miniform measurement, form measurement on uncooperative or not very cooperative surfaces, such as also e.g. human liver tissue. One example of the application of the invention here includes detection of the microform on the inner ear in humans in the surgical operation phase. Use in endoscopic 3D systems is intended to lead to highly miniaturizable sensor solutions having high measurement accuracy.

A further field of application is also intended to be the measurement of non-polished aspheres and/or freeform surfaces.

A particular motivation for the application of the invention is the utilization of the interferometric gain of a weak object signal for measurements including on a mesoscopic and/or macroscopic scale. That is very highly advantageous in mechanical engineering, for example, where a measurement uncertainty in the sub-micron range is not always necessary in the measurement of many technical objects. The use of the interferometric gain is intended also to enable object elements having extremely low reflectivity still to be detected metrologically comparatively well in terms of depth, for example with a measurement uncertainty in the single-digit micron range. Therefore, the highly accurate measurement of the form of partly reflective, weakly light-scattering and in this case inclined gear tooth surfaces is also intended to be a preferred field of use for the invention.

The measuring arrangement (or measuring device) and the method are also intended to be able to be used for optical coherence tomography (OCT), in particular with multi-point scanning, for technical or biological objects.

In one preferred embodiment of the measuring arrangement according to the invention, the use of means for dispersive spectroscopy is dispensed with.

In this case, the term light is always used as a synonym for electromagnetic radiation from the terahertz through infrared to the deep UV range.

This aspect concerns a method and an arrangement for robust interferometry for detecting distance, depth, profile, form, undulation and/or roughness or the optical path length in or on technical or biological objects, including in layered form, or else for optical coherence tomography (OCT) for technical or biological objects. The arrangement is described below. In this case, the following means are used in the method:

- a source of short-coherent electromagnetic radiation for illuminating the object,
- an interferometer, in particular also in the form of an interference microscope, having an object beam path and having at least one reference beam path, in which at least one end reflector is arranged, and a measurement plane in the object beam path, in which measurement plane the surface or volume elements of the object which are to be optically measured are at least approximately situated.
- And at least one line-scan detector for detecting electromagnetic radiation in the form of at least one spatial interferogram.

The source of short-coherent electromagnetic radiation is also designated hereinafter as light source, wherein here light is understood within the meaning of electromagnetic radiation from terahertz through IR, VIS to UV radiation. The light source can generate a laterally finely structured illumination pattern on the object. In this case, the light source can constitute a point emitter, a lateral line emitter or a group of point emitters in line or matrix form also with individually switchable punctiform or linear luminous elements.

The light source can constitute a single- or multicolored LED or OLED, a superluminescence diode, a supercontinuum light source, a frequency-comb-based laser, a halogen lamp or else light sources based on incandescent light.

The line-scan detector can be a gray-scale or color CCD or a gray-scale or color CMOS camera in line or matrix form.

The physical-optical depth of view range here at least approximately defines the depth range of the measuring arrangement in which the measurement plane is situated, such that reference can also be made here to a measurement volume in the object volume. The latter must contain the surface or volume elements involved in the optical scanning.

According to the invention, at least one end reflector having three plane mirrors as reference reflector, that is to say at least one three-plane-mirror reference end reflector, is arranged in the reference beam path of the interferometer and the surfaces of these three plane mirrors in each case lie at least approximately perpendicular to a common reference plane BE.

In this case, the three trace lines of the planes which are represented by the surfaces of the three plane mirrors form a triangle ABC in the reference plane BE, in order that there is a lateral shear between reference beam and object beam in this interferometer, said lateral shear representing a path having the absolute value delta_q. The paths AB, BC and CA of said triangle ABC have to have a certain length for this purpose. By way of example, the length of these paths can typically in each case be of the order of magnitude of a few tenths of a millimeter up to a few millimeters mm. In this case, the angles of said triangle are not extremely acute, nor does said triangle constitute a right-angled triangle. The resulting lateral shear can have an absolute value delta_q of the order of magnitude typically of 0.1 mm up to a few millimeters. In the case of an arrangement having a microscope with high lateral resolution and having a centroid wavelength in the UV range, however, the absolute value delta_q can also be of the order of magnitude of a few hundredths of a millimeter. This is based on correspondingly small lengths of the paths AB, BC and CA and the corresponding three angles of the triangle ABC. This approach can be scaled widely with regard to the absolute value delta_q.

The lateral shear having the absolute value delta_q between reference beam and object beam exists in the virtual mirror plane VSE of the three-plane-mirror reference end reflector in the reference beam path. The virtual mirror plane VSE is at least approximately optically conjugate with the measurement plane ME of the object beam path by virtue of beam splitting. In this case, the three-plane-mirror reference end reflector is angularly oriented such that electromagnetic radiation from the reference beam path reaches the line-scan detector.

As is known, a trace line in descriptive geometry denotes the line of intersection between a plane in space, here in each case a plane defined by a plane mirror surface, and a base plane, here the reference plane BE.

A lateral displacement of a three-plane-mirror reference end reflector does not lead to a change in the absolute value of the lateral shear delta q. This invariance is regarded as a major technical advantage since this results in high robustness of the signal production in relation to such misalignments. This invariance is also a good prerequisite for the use of double-slit or double-pinhole diaphragms in an imaging detection beam path, since a constant absolute value of the lateral shear delta q in the detection beam path leads to a distance between spatially coherent point images which is constant in the long term. By means of a double diaphragm, which can also be represented by a spatial light modulator, said spatially coherent point images can be used for generating point diffraction interferograms with a high contrast. In this case, the measurement plane ME in the object beam path and the plane in which the double diaphragm is situated are at least approximately optically conjugate.

The three-plane-mirror reference end reflector is a reflector that generates lateral shear in the interferometer according to the invention. In this case, the three-mirror reference end reflector, as already explained, has a virtual mirror plane VSE. The occurrence of the lateral shear can be spatially assigned to said virtual mirror plane VSE. By way of example, the interference of an object spherical wave and a reference spherical wave, which are generated by the interferometer and the sphere centers of which are separated by a lateral shear of the absolute value delta q, at least in a delimited partial region of the detector plane, leads to a spatial interferogram having an at least approximately constant spatial frequency for the centroid wavelength, since the interfering wave surfaces on the detector are inclined with respect to one another. In a delimited segment of the spherical wave surfaces, the latter can generally be approximated sufficiently well by plane waves. This interference phenomenon of two spatially coherent spherical wave surfaces that is to be registered on a detector is sufficiently known to the person skilled in the art in optics as Young's classic double-slit experiment, wherein the distance d between the slits in the double-slit experiment here corresponds to the lateral shear having the absolute value delta q.

The lateral shear having the absolute value delta q therefore serves here as a basis for the generation of one or a plurality of spatial interferograms which, in terms of their spatial frequency for the centroid wavelength, should not be influenced or should be influenced only very insignificantly by the inclination of the object surface if the punctiform center of the object spherical wave lies on a surface element, that is to say that the object is also illuminated at least approximately in a punctiform manner by focused light. A prerequisite in this case, of course, is also the constancy of the spectrum of the interfering light components. This invariance of the spatial frequency for the centroid wavelength is very highly advantageous for the evaluation of spatial interferograms since here, for example, on account of the prior knowledge of the spatial frequency for the centroid wavelength in the signal, robust and comparatively fast lock-in approaches can be employed, which are at least approximately set to said spatial frequency for the centroid wavelength. Algorithms based on a lock-in approach here allow, even from signals that are very noisy and influenced by aberrations, spatial interferograms to provide depth information with comparatively low measurement uncertainty. Since a source of short-coherent electromagnetic radiation is used here, short-coherence interferograms having an envelope arise here. In the simplest case, the maximum or the centroid of the envelope can be used, for example for determining the depth of an object point or the optical path length at a point of an object. In this case, it is also possible to determine the optical layer thickness of transparent media. This is particularly simple if the layer thickness is greater than the coherence length of the electromagnetic radiation of the source, since the maxima or the centroids of the envelopes of the short-coherence interferograms are then distinctly separated. The chirp effect occurring in this case in the short-coherence interferogram of the deeper object point as a result of dispersion in the refractive medium can be treated in a model-aided manner during evaluation.

On the line-scan detector, a short-coherent spatial interferogram is preferably detected for each object point in a laterally extended region, such that a complete line profile can be obtained by recording a single image with preferably many juxtaposed spatial interferograms and the evaluation thereof.

It should be emphasized here that, in principle, end reflectors having an arbitrary odd number $2n+1$ of plane mirror surfaces—where n is greater than/equal to 2—can be used as reference reflectors if said plane mirror surfaces are in each case perpendicular to a reference plane BE and are passed only once. The lateral shear delta q required for the measuring method is generated in all these cases. Moreover, optimally no inversion of the reference wavefront with respect to the object wavefront occurs if what takes place there is only a single reflection or a likewise odd number $2n+1$—where n is greater than/equal to 1—at the object or further plane mirror surfaces. It holds true here that the difference in the number of reflections between reference beam path and object beam path must be $2n$—where n is greater than/equal to zero. Both from an economic stempoint and for reasons of an optimum sensor design and sensor manufacture, the use of an end reflector having three plane mirrors as reference reflector and with direct optical scanning of the object without further plane mirrors, such that a single reflection takes place in the object beam path, is the optimum technical and also economic solution for the great majority of cases.

Preferably, in the arrangement for robust interferometry, the three trace lines form an obtuse triangle ABC in the reference plane BE. In this case, it is advantageous that, in a mirror arrangement of this type, the angles of incidence on the three plane mirrors—including those of the marginal rays of an illumination beam—can be kept below 60°. By way of example, if half of the aperture angle of the illumination beam is 8.6 degrees, the numerical aperture is therefore approximately 0.15, and the angle values are 21 degrees, 24 degrees and 135 degrees.

Preferably, in the arrangement for robust interferometry, the three trace lines form an acute triangle ABC in the reference plane BE. By way of example, the angle values can be of the magnitude of 52, 64 and 64 degrees. It is advantageous in this case that the manufacture of a three-mirror reference end reflector in which the trace lines of the three plane mirrors form an acute triangle is generally comparatively simple, for example by means of single-point diamond processing or molding technology, since there is generally good accessibility to the surfaces of the three plane mirrors. However, comparatively large angles of incidence on the three plane mirrors occur, which can have a considerable influence on the light polarization and the polarization-dependent reflectance.

Preferably, in the arrangement for robust interferometry, the three plane mirrors are arranged in throat form. A mirror arrangement in throat form can be produced comparatively well.

Preferably, in the arrangement for robust interferometry, the three plane mirrors are arranged in labyrinth form. In other words, three individual plane mirror surfaces are arranged in a three-plane-mirror reference end reflector in each case as an open mirror throat or as a mirror labyrinth. In this case, the beam path in the three-plane-mirror reference end reflector in the case of the throat can consist in a crossed form. In the case of the labyrinth, by contrast, the beam path can be embodied in irregular or regular M-form. In this case, one or a plurality of three-mirror reference end reflectors can be embodied in miniaturized fashion in a metal plate. In particular, single-point diamond processing technology is appropriate for producing the three-mirror reference end reflectors in throat form. However, molding, embossing and/or printing technology can also be employed.

Preferably, in the arrangement for robust interferometry, the three-plane-mirror reference end reflector is arranged angularly in the interferometer such that the chief ray of the emerging reference beam, after passing through the three-plane-mirror reference end reflector propagates at least approximately parallel to the chief ray of the arriving reference beam. In this case, the offset of the chief rays then has the absolute value of the lateral shear delta_q. In this case, it is advantageous for the evaluation of interferograms that the lateral shear of the absolute value delta_q is invariant with regard to lateral displacements of the reference reflector. Furthermore, in the case of a three-plane-mirror reference end reflector having three plane mirrors inclined with respect to one another, there is no wavefront inversion between object radiation and reference radiation. That considerably reduces the requirements made of the illumination optical system.

With the use of a light source with beam shaping optical system for illuminating the object with a focal spot or linear illumination with the longitudinal axis in the direction of the line of intersection g, a small tilting of a three-mirror reference end reflector that is embodied monolithically and is thus intrinsically rigid plays a practically subordinate part.

In an embodiment with strong vibrations, it is possible to use a pulsed light source in order to obtain signals that can be evaluated well on the basis of spatial interferograms.

If the focal point BF of a reference beam of rays is incident on the virtual mirror plane VSE of the three-mirror reference end reflector, it is offset by the lateral shear having the absolute value delta_q in the virtual mirror plane VSE and the focal point BF' arises. In this case, the path which represents the lateral shear having the absolute value delta_q is always parallel to the line of intersection g of reference plane BE and virtual mirror plane VSE.

Preferably, in the arrangement for robust interferometry, a lens having the focal length f13' or f17', which lens collimates the object beam in the direction of detection, is arranged such that its focal plane F13 or F17, respectively, facing the object coincides with the virtual mirror plane VSE of the three-plane-mirror reference end reflector. Alternatively, by means of a further imaging stage between a lens for collimation and the virtual mirror plane VSE of the three-plane-mirror reference end reflector, it is possible to achieve this coinciding as optical conjugation (VSE-S13 or VSE-F17, respectively).

The optical conjugation can also be produced by beam combining. The virtual mirror plane VSE of the three-plane-mirror reference end reflector, which can also be regarded as the virtual reflection plane of this end reflector, then represents an optically conjugate plane with respect to the measurement plane of the object beam path. In this case, the lateral shear of the absolute value delta_q also arises in the focal plane F13 or F17 of the lens which collimates the object beam in the direction of detection.

The virtual mirror plane VSE therefore represents exactly one assembly-fixed plane in the described three-plane-mirror reference end reflector having three plane mirrors on which the chief ray of an incident homocentric beam can impinge perpendicularly. Furthermore, the center BF of the homocentric beam can lie in the virtual mirror plane VSE. The center of the emergent homocentric beam BF' is then offset by the lateral shear having the absolute value delta_q in the VSE and the chief ray of said beam is also perpendicular to the VSE. In this case, the connecting path of the two beam centers, which indeed has the absolute value, that is to say the length, delta_q, is parallel to the reference plane BE defined by the three plane mirror surfaces.

This inventive approach makes it possible to detect the spatial interferograms of all object points which are situated on an arbitrary point of the useable object field, which at least approximately lies in the focal plane (F13), on the same detector area. This is because in the focal plane (F13') there is no lateral movement of the object beam depending on the lateral position of a measurement point in the object field. Ideally then given an axially perpendicularly aligned plane mirror as object, this mirror lying in the focal plane F13, and a highly corrected optical system with lateral through-switching of the illumination pattern in the object field, as a result of which arbitrary points in the object field can be scanned, the maxima of the envelopes of the short-coherence interferogram or else the centroids thereof arise at least approximately at the same location in each case, that is to say in each case the same pixels or in direct proximity thereto, on the detector. Upon weak tilting of the plane mirror about an axis perpendicular to the reference plane BE and time-sequential scanning of the plane mirror with light spots of a controlled light source along a line parallel to the reference plane BE, the centroids ideally then likewise lie on a line on the detector.

Upon the positioning of an object in the focal plane F13 in the object beam path, wherein spatial interferograms are detected in the focal plane F13' or an optically conjugate plane, the spatial frequency for the centroid wavelength, or the centroid wavenumber, of the spatial interferograms should not be influenced by the inclination of the object surface if the latter is spectrally non-selective, that is to say is gray, for example. In this case, it is advantageous for a high contrast of the interference, however, if the object is illuminated in a punctiform manner or linearly by focused light. This invariance of the spatial frequency for the centroid wavelength, which only exists under the prerequisite of a constant light spectrum, is very greatly advantageous for the evaluation of spatial interferograms since here, for example, on account of the prior knowledge of said spatial frequency in the signal, robust and comparatively fast lock-in approaches can be employed, which are at least approximately set to said spatial frequency for the centroid wavelength. Algorithms based on a lock-in approach here tend to allow, even from signals that are greatly noisy and influenced by aberrations, spatial interferograms to provide depth information with a comparatively reduced measurement uncertainty.

Preferably, in the arrangement for robust interferometry, the lateral shear of the absolute value delta_q is less than the absolute value or equal to 30% of the absolute value of the focal length f13' of the lens which collimates the object beam at the output of the interferometer. The absolute value delta_q of the lateral shear should not exceed the field in which the lens is well corrected. In general, the lateral shear should be chosen to be distinctly less than 10% of the absolute value of the focal length f13' or of the focal length f17', respectively.

Preferably, in the arrangement for robust interferometry, the line-scan detector is arranged in each case at least approximately in the focal plane (F13') of a lens which collimates the object beam at the output of the interferometer, or the line-scan detector is arranged, in the light direction, in a plane EK that is disposed downstream of said focal plane (F13') and is optically conjugate with respect to said focal plane (F13'), wherein the optical conjugation of focal plane (F13') and the plane EK is provided by at least one beam of rays. That means that points of said focal plane (F13') are imaged into the plane EK by at least one beam of rays.

Preferably, in the arrangement for robust interferometry, the axis y of a cylindrical optical system is arranged parallel to a straight line g representing the line of intersection of the reference plane BE and the virtual mirror plane VSE.

For the light coming back from an optically scanned object point and the superimposed reference light, this leads to a one-dimensional focusing of the interfering light along a line and thus leads to a comparatively high light concentration of the interfering wavefronts, here in cylindrical form. In addition, this beam guiding affords the possibility of simultaneously recording the spatial interferograms of a plurality of object points, for example those along a line LO on the object. These linear interferograms are detected in each case in a likewise linear region, i.e. along one or a few lines of the line-scan detector. The longitudinal axes of these linear regions are in each case perpendicular to said line LO.

The scanning of an object along a line with a multiplicity of spatial interferograms and the calculation of a profile ensuing therefrom have already been explained by M. Hering et al. in.

Preferably, in the arrangement for robust interferometry, a multiplicity of miniaturized three-plane-mirror reference end reflectors in the form of an array are arranged in the reference beam path. It is thus possible for an object field to be scanned by focal points time-sequentially as in the case of a pin cushion or a bed of nails using a controllable light source, as a result of which, for example, a form measurement on a small object having a limited depth extent, for example a microdent or a flat lubrication pocket in a metal body, is possible.

Preferably, in the arrangement for robust interferometry, three-plane-mirror reference end reflectors are arranged in this array in a linear, areal or three-dimensional structure. In this case, it is possible to record measurement points respectively along a line simultaneously in one shot.

Preferably, in the arrangement for robust interferometry, miniaturized three-plane-mirror reference end reflectors are arranged in the form of a three-dimensional staircase structure. Weakly inclined object surfaces can thus be measured, without the centroids of the envelopes of the interferograms being greatly displaced laterally.

Preferably, in the arrangement for robust interferometry, the source of short-coherent electromagnetic radiation is embodied as a dot matrix emitter.

Preferably, in the arrangement for robust interferometry, the dot matrix on the source of short-coherent electromagnetic radiation is arranged in a manner rotated by an acute angle with respect to the intersection line of the interfering wavefronts on the line-scan detector. In this case, therefore, the axis of rotation is arranged perpendicular to the VSE and parallel to the BE. Thus, a multiplicity of interferograms can be positioned on the detector simultaneously.

Preferably, in the arrangement for robust interferometry, the source of short-coherent electromagnetic radiation is embodied with switchable point light sources. The scanning pattern is thus freely selectable, for example also according to the relevance of object features from prior information.

Preferably, in the arrangement for robust interferometry, the line-scan light source is embodied with switchable line light sources. An object field for form measurement can thus be measured particularly rapidly.

Preferably, in the arrangement for robust interferometry, the source of short-coherent electromagnetic radiation is designed for the laterally finely structured illumination of an object by means of a switchable spatial light modulator array, such that said source of short-coherent electromagnetic radiation is embodied in a laterally switchable fashion. High flexibility is thus afforded. It is thus possible to realize different illumination patterns on the object in a temporal sequence, such that, by way of example, in the case of an embodiment of the reference reflector with linear, miniaturized three-mirror reference end reflectors, the object is successively illuminated in each case with an individual line and from defined locations on the overall reference reflector until the object field has been completely scanned for example by a line progressively moving laterally in steps. The lateral density of the scanning pattern is selectable, as a result of which relevant regions can be measured with a higher scanning density as necessary.

Preferably, in the arrangement for robust interferometry, in the reference beam path there is a spatial correspondence between the lateral structure of the illumination pattern and the lateral arrangement of miniaturized three-plane-mirror reference end reflectors, such that each miniaturized three-plane-mirror reference end reflector is assigned at least one light spot or one light line of the light source, at least in the time duration the time duration of an image recording.

Preferably, in the arrangement for robust interferometry, at least one double diaphragm on the basis of slits or pinholes is arranged in a jointly used imaging stage for reference radiation and object radiation. In this case, a first opening of the double diaphragm is reserved for the reference radiation and a second opening is reserved for the object radiation. A confocal discrimination of the object radiation can thus be carried out. The first region serves for passage of the reference light in the direction of the detector and can, however, also mask out undesirable stray light from the reference beam path. The slits or pinholes, that is to say the diaphragm elements, can, however, also be embodied so finely that cylindrical or spherical waves of high spatial coherence are formed.

Preferably, in the arrangement for robust interferometry, the double diaphragm is arranged in an optically conjugate plane with respect to the measurement plane ME, wherein the optically conjugate plane is represented by at least one beam of rays. A confocal discrimination of object radiation can thus be carried out.

Preferably, in the arrangement for robust interferometry, means for the predetermined controlled change of the distance and/or the position of the slits or the pinholes of the double diaphragm are arranged in order that the confocal filtering can be carried out optimally.

Preferably, in the arrangement for robust interferometry, means for the chromatic depth splitting of foci are arranged in the object beam path. It is thus possible to realize a significantly larger depth measurement range with nevertheless diffraction-limited lateral resolution than the physical-optical depth of view. This approach, in particular with multi-point scanning of the object, can be implemented well by means of a Linnik-type interferometer with a comparatively small numerical aperture. In this case, the means for chromatic depth splitting can be arranged in the Fourier plane of the object-imaging lens. A diffractive optical element can be used for this purpose. The arrangement of a diffractive optical element in the Fourier plane has already been explained in DE 103 21 895 A1. This leads to a constant imaging scale for radiation of all wavelengths.

Preferably, in the arrangement for robust interferometry, at least one confocally discriminating diaphragm is arranged in the object beam path. Said diaphragm allows, during the chromatic depth splitting, only passage of light which was sharply focused on the object surface or in a partly transparent object at a light scatterer.

Focused radiation for object illumination is therefore reflected and/or scattered at the object, and passes once again the means for chromatic depth splitting of foci, as a result of which a wavelength-dependent refractive power becomes effective, which leads to the at least partial collimation of the components of the electromagnetic radiation which formed foci on or in the object. Afterward, the collimated electromagnetic radiation passes through a lens for focusing and afterward at least partly the confocally discriminating diaphragm. Only the components of the electromagnetic radiation which formed foci on or in the object can substantially pass through said confocally discriminating diaphragm.

In this case, said confocally discriminating diaphragm can also be used for generating foci for structured object illumination. Overall, radiation then passes through this diaphragm twice, that is to say radiation propagating forward and back. In this case, this diaphragm is situated at the input of the interferometer. After the return of object radiation and reference radiation to the interferometer input, which then also constitutes the interferometer output, the confocal discrimination of object light and interference on the detector occur.

It is advantageous in this case if the means for the chromatic depth splitting of foci, for the average wavelength of the spectrum of the electromagnetic radiation used, have the refractive power of zero, that is to say are refractive-power-compensated, for example as a diffractive-refractive system having opposite refractive power of the components. In that case, with corresponding compensation of the optical path lengths in the reference beam path, the interferometer can be operated at least approximately at the optical path difference of zero or in a comparatively narrow range around the optical path difference of zero, and dispersion can largely be disregarded. This approach can advantageously be employed in a Linnik-type interferometer in which microscope objectives corrected toward infinity are used. In this Linnik-type interferometer, at least one three-mirror reference end reflector is arranged in the reference beam path.

Preferably, in the arrangement for robust interferometry, the interferometer in the basic type is designed as a Michelson, Linnik, Mirau or Schulz-Minor interferometer and at least one three-mirror reference end reflector is arranged in the reference beam path. In this case, the numerical aperture should not be chosen to be extremely high, since otherwise the reflection by means of a three-plane-mirror reference end reflector is no longer possible. Therefore, the main emphasis of the use of the arrangement according to the invention is very clearly in the area of a medium or relatively small numerical aperture for object illumination and detection.

By way of example, a lens having a numerical aperture of 0.2 can still be used very well in conjunction with a three-plane-mirror reference end reflector in the reference beam path.

In the case of a Michelson interferometer arrangement, it is possible here to deviate greatly from the right-angled configuration between reference and object beam paths. Thus, an angle between the principal beams of rays of reference radiation and object radiation of 160 degrees is preferably a good option for realizing a slim sensor with good accessibility to the measurement object.

In the case of a Mirau or Schulz-Minor interferometer, the central shading that occurs as a result of the reference reflector can be rendered harmless by the use of a double-slit or double-pinhole diaphragm with suitable slit or pinhole spacing, which are in each case embodied very finely, that is to say constitute a point diffraction arrangement. However, considerable light losses can occur as a result. However, this is generally technically feasible with light sources of high spatial coherence and light power.

Preferably, in the arrangement for robust interferometry, means for the predetermined variation of the numerical aperture of the illumination are arranged. Thus, the physical-optical depth of view range can be optimally adapted to a measurement task.

For the occasionally occurring measurement task that the intention is to measure an object surface at an inclination with respect to the optical axis of the object beam path, for example a 45° chamfer surface on a finely milled workpiece, in the object beam path of the interferometer an additional plane mirror can be assigned to the object surface, wherein said plane mirror should then at least approximately form a right angle, that is to say at least approximately forms a 90° roof edge, with the object surface. In this case, a 90° roof edge reflector is arranged in the reference beam path, wherein the mirror surfaces of said reflector are intended always to experience only a single reflection. This arrangement in conjunction with a Michelson interferometer yields lateral shear, avoids wavefront inversion, but generally has distinct disadvantages owing to the structural volume in the object beam path, that is to say with regard to accessibility to the object, for example in interior spaces, and is therefore not pursued further here. Said Michelson interferometer arrangement, with the possibility of producing lateral shear by means of two double roof edge reflectors, is traditional and is generally used for wavefront analysis, also see D. Malacara, Optical Shop Testing, John Wiley & Sons Inc., 1992, pages 140-141, FIG. 4.16 and W. H. Steel, Interferometry, Cambridge University Press, 1967 page 83 last paragraph to top of page 84.

Using the approach published in D. Kelsall in 1959 in Proc. Phys. Society, 73, page 470, FIG. 1 having two triple reflectors in a Michelson interferometer, here as an arrangement for an interferometric sensor for distance measurement, inter alia, wherein a plane mirror of the triple reflector in the form of a corner cube is replaced by the object surface, has the effect that it is also necessary to assign a roof edge reflector to the object in the object beam path if the undesired wavefront inversion between object radiation and reference radiation is intended to be avoided. This is a possible sensor solution but enlarges the sensor volume very considerably, which is very disadvantageous for many applications or this totally precludes the use of such a solution. Moreover, in this case there is no invariance of the lateral shear and thus of the inclination of the interfering wavefronts for example in relation to lateral drifting away of the triple reference reflector or else of the object itself. Thus, the spatial frequency in the spatial interferogram can change, which can be disadvantageous.

Preferably, for oblique illumination of an object surface, two further plane mirrors, one respectively on the right and one respectively on the left, can be assigned in a flanking manner and the already described three-mirror reference end reflector with obtuse or acute triangle ABC of the trace lines is situated in the reference beam path. In this case, the difference in the number of plane mirror surfaces of reference beam path and object beam path which are passed once by the light is zero, such that no wavefront inversion occurs. In this case, the absolute value delta_q of the lateral shear can be set freely by lateral shifting of the end reflector having three plane mirrors. This arrangement allows virtually flat object surfaces to be illuminated highly obliquely, for example with an angle of incidence of 85°. It is thus possible to implement oblique light interferometry for detecting straightness, form and undulation on comparatively rough technical surfaces, such as finely machined flat metal surfaces. The oblique incidence results, as is known, in a reduction of the depth measurement sensitivity of the interferometer by the factor of the cosine of said angle of incidence on the object surface, also known as lambda extension.

If, in the object beam path of the inventive arrangement, the 90° deflection mirror is used, for example, for measurement on the inner wall of a small hole, said mirror being passed by the light both in forward and in return passage, this 90° deflection mirror, owing to the double reflection at it, has no influence on the orientation of the object wavefronts during detection and can thus be left out of consideration with regard to the problem of wavefront inversion.

In the method for robust interferometry for detecting distance, depth, profile, form, undulation and/or roughness or the optical path length in or on technical or biological objects, including in layered form, or else for optical coherence tomography (OCT), using the means in the preamble of the arrangement, the following method steps:
 generating at least one object beam of rays of electromagnetic radiation for illuminating the object,
 generating at least one reference beam of rays by means of beam splitting in an interferometer,
 generating spatial short-coherence interferences of object and reference rays,
 detecting spatial short-coherence interferences on a line-scan detector of electromagnetic radiation,
are carried out.
 According to the invention,
 in the reference beam path three, directly successive reflections are carried out at three respective plane mirrors,
 in this case the surfaces of said three plane mirrors in each case lie at least approximately perpendicular to a common reference plane BE and thus form a three-plane-mirror reference end reflector,
 and the three reflections introduce a lateral shear having the absolute value delta_q between object beam of rays and reference beam of rays in the interferometer, as a result of which at least one spatial short-coherence interferogram is generated on the line-scan detector,
 and at least one spatial interferogram is evaluated in order to obtain information about distance, depth, profile, form, undulation and/or roughness or the optical path length of an object, including in optical coherence tomography.

The invariance of the lateral shear having the absolute value delta q between the object beam of rays and reference beam of rays in relation to lateral displacements of the three-plane-mirror reference end reflector is a major advantage since the spatial frequency for the centroid wavelength of the spatial interferogram is thus constant given an invariable spectrum of the light source, e.g. also in the case of thermally induced lateral drifting away of the reflector as a monolithic assembly. By contrast, a displacement of the reflector in terms of depth owing to the changing optical path length leads to the lateral displacement of the spatial interferogram on the detector.

In the method for robust interferometry, preferably a punctiform or a laterally structured illumination of the object is effected in order to minimize the stray light, for example.

In the method for robust interferometry, preferably the reflections of the chief ray of the reference beam of rays are carried out such that the impingement points of the chief ray of the reference beam on the three plane mirrors lie at least approximately in a common plane oriented parallel to the common reference plane BE.

In the method for robust interferometry, preferably downstream of the lens (13) which collimates the object beam, in the downstream focal plane F13' thereof,
  from the predetermined lateral shear delta_q of reference beam and object beam in the focal plane F13 disposed upstream of the lens (13) and representing the measurement plane ME of the arrangement—
a tilting by the angle delta_beta of the chief rays of reference beam and object beam is produced.

Moreover, the detection of a spatially extended two-beam interferogram is carried out
  either in said focal plane (F13')
  or in an optically conjugate plane disposed downstream of said focal plane (F13') in the light direction, wherein this downstream optically conjugate plane is represented at least by a beam of rays in a plane.

The advantage in this case is that the tilting of the chief rays of reference beam and object beam with respect to one another by the angle delta beta is invariant in relation to a change in position, such as translations in all three spatial axes, of an intrinsically rigid, that is to say monolithic, three-plane-mirror reference end reflector in the reference beam path. This also applies to the object and the beam splitter, for example in a Michelson-type interferometer. Smaller rotations of the intrinsically rigid three-plane-mirror reference end reflector, of the object or of the beam splitter in the interferometer arrangement which is used for both beam splitting and combining likewise lead to no or only to a second-order influence on the absolute value of the angle delta_beta, as a result of which, given a temporally constant light source spectrum and a gray, black or white object surface, the spatial frequency for the centroid wavelength in the spatial interferogram can be regarded as virtually invariable. A colored object surface, too, generally has only a relatively small influence on the spatial frequency for the centroid wavelength. Layer systems, such as spectral bandpass filters, can form exceptions here, however.

In the method for robust interferometry, preferably a beam shaping of reference beam of rays and object beam of rays by means of an imaging cylindrical optical system with focusing of at least one beam of rays into the focal plane (F13') of the object-imaging lens is carried out.

In the method for robust interferometry, preferably a beam shaping of reference beam of rays and object beam of rays by means of an imaging cylindrical optical system with focusing of at least one beam of rays into an optically conjugate plane disposed downstream of the focal plane (F13') of the object-imaging lens in the light direction is carried out and said conjugate plane is provided at least by a beam of rays.

In the method for robust interferometry, preferably a segment of the focal plane (F13') is imaged onto the detector by an anamorphic imaging stage—situated downstream in the light direction—at least approximately by a first beam of rays, whose surface is arranged perpendicular to the intersection line of reference wavefront and object wavefront in the focal plane (F13'). In addition, each optically detected object point is preferably imaged in a focused manner onto the detector by a second beam for rays, which is oriented perpendicular to the first, such that for each optically detected object point on the detector at least one spatially extended, linear two-beam interferogram is generated at least approximately in linear form and the linear two-beam interferograms of the optically detected object points are preferably arranged on the detector in stacked form, wherein a dedicated region on the detector is reserved for each linear two-beam interferogram.

In this case, each two-beam interferogram has an average modulation frequency resulting from the geometry of the interferometer arrangement and the light source spectrum, including spectral reflection properties, which modulation frequency is therefore predetermined.

In the method for robust interferometry, preferably a laterally finely structured illumination of the object and the three-plane-mirror reference end reflector in the form of a time-serially switchable illumination pattern is carried out and after each switching operation at least one spatial interferogram is recorded by the line-scan detector.

In the method for robust interferometry, preferably the measurement plane ME and the miniaturized three-mirror reference end reflectors corresponding optically to the measurement points of the measurement plane ME in the reference beam path are temporally laterally scanned by virtue of the fact that the source of short-coherent electromagnetic radiation for the laterally finely structured illumination, which is therefore embodied in a switchable manner, gradually illuminates different lateral regions of the object and, for each illumination pattern, spatial interferograms are recorded by means of the line-scan detector.

In the method for robust interferometry, the lateral scan of the illumination pattern in the measurement plane ME preferably takes place in a stepwise manner and in accordance with the lateral distances between the individual three-mirror reference end reflectors in the reference beam path.

In the method for robust interferometry, the three-plane-mirror reference end reflector is preferably displaced laterally in a manner synchronized with the illumination pattern. Thus, the measurement plane ME can be optically laterally scanned gradually, that is to say over time.

In the method for robust interferometry, the reflectances of adjacent micro-reference reflectors are preferably designed to be greatly different. By illuminating a different three-mirror reference end reflector, which has a greatly different reflectance, and lateral repositioning of the sensor with respect to the object, it is possible to achieve a better adaptation of the intensity of the reference beam to the intensity of the object beam, particularly if an object region has a very low reflectance.

In the method for robust interferometry, preferably at least one three-plane-mirror reference end reflector is produced in a metal or plastics body by means of a single-point diamond processing technique. This can be effected highly accurately and comparatively cost-effectively.

In the method for robust interferometry, preferably at least one three-plane-mirror reference end reflector is produced by molding technology.

In the method for robust interferometry, preferably at least one three-plane-mirror reference end reflector is produced by etching technology.

In the method for robust interferometry, preferably at least one three-plane-mirror reference end reflector is produced by molding, hot or cold embossing or else printing technology.

In the method for robust interferometry, preferably the phase of at least one spatial interferogram is evaluated in order to obtain information about distance, depth, profile, form, undulation and/or roughness or optical path length of an object.

In the method for robust interferometry, preferably the centroid of the envelope of at least one spatial interferogram is evaluated in order to obtain information about distance, depth, profile, form, undulation and/or roughness or optical path length of an object.

In the method for robust interferometry, preferably the maximum of the envelope of at least one spatial interferogram is evaluated in order to obtain information about distance, depth, profile, form, undulation and/or roughness or optical path length of an object.

In the method for robust interferometry, preferably the direct component of at least one spatial interferogram is evaluated in order to obtain information about distance, depth, profile, form, undulation and/or roughness or optical path length of an object. Information about the object can be obtained from the spatial distribution of the direct component of the spatial interferogram.

In the method for robust interferometry, preferably in the object beam path a chromatic depth splitting of foci is carried out in a predetermined manner with spectrally refractive-power-variable means in the object beam path. The depth measurement range can thus be increased.

In the method for robust interferometry, preferably radiation from the object is confocally discriminated after the second passage of the spectrally refractive-power-variable means. Afterward, said radiation from the object is superimposed with radiation from the reference beam path in order to form at least one spatial interferogram and the intensity distribution of the spatial interferogram is subjected to a Fourier transformation according to the method of Fourier transformation spectroscopy in order to obtain the spectrum also of confocally discriminated radiation from the object after chromatic depth splitting, in order to determine from this spectrum the distance, the depth, the profile, the form, undulation and/or the roughness or the optical path length of an object. For this purpose, a centroid evaluation can be carried out. In this case, substantially only the wavelength components which were sharply focused on the object, that is to say formed foci there, and were accordingly able to pass through a confocal diaphragm lead to appreciable components in the spectrum. The spectrally broadband intensity component from the reference beam path is not manifested in a modulation in the interferogram, nor is it therefore manifested in the spectrum calculated by Fourier transformation, since the broadband intensity components from the object beam path have already been lost on account of the depth splitting of foci with subsequent confocal discrimination and, consequently, cannot contribute to the formation of interference. Only the component of light from the reference beam path is spectrally comparatively broadband here, but owing to the lack of spectrally broadband object light components it cannot lead to a modulation in the interferogram. Consequently, a comparatively narrowband spectrum of radiation from the object beam path transmitted at the confocal diaphragm arises after the Fourier transformation of the spatial interferogram. The modulation is not very great in such an interferogram with a high degree of chromatic depth splitting, but is spatially comparatively more greatly extended on account of the increased coherence length as a result of the confocal separation of spectrally delimited light components. As a result of the Fourier transformation of the spatial interferogram, the centroid wavelength of the radiation transmitted in each case—depending on the object distance—at the confocal diaphragm can be numerically determined comparatively accurately.

Thus, the distance, the depth, the profile, the form, undulation and/or the roughness or the optical path length of an object can be determined by a calibration. This approach makes it unnecessary to use a dispersive spectrometer for determining the spectrum in the chromatic-confocal method. This approach with Fourier transformation of the spatial interferogram for obtaining a chromatic-confocal signal can additionally be used here in order to be able to carry out multivariate or multiscale measurement.

Preferably, object radiation from the downstream focal plane F13', which represents the Fourier plane of the object-imaging beam path and can generally also represent the pupil plane, is coupled out from the principal beam path by the beam splitting disposed downstream of said focal plane F13' in the light direction. This object radiation is provided for detection temporally synchronously with the recording of spatial interferograms on the same detector or a detector synchronized temporally with the line-scan detector, by means of imaging. Thus, both the pupil illumination resulting from an optically scanned object point and the spatial interferogram can make available precisely said object point simultaneously on one and the same camera chip or two camera chips electronically synchronized with each other.

In this case, the reference radiation which here, if appropriate, is concomitantly coupled out at the beam splitter from the principal beam path into this secondary beam path for pupil observation is blocked for example in proximity to a focal point of said radiation, that is to say where object radiation and reference radiation are distinctly spatially separated. It is thus possible that only the object radiation can be provided for detection. A beam splitter for coupling-out which covers both object beam path and reference beam path and which constitutes, for example, a cube of low-stress quality glass manufactured with high precision introduces in the same or almost the same way dispersion and optical path length change both into the object beam path and into the reference beam path and is thus practically not present for white light interferences since ideally the optical path difference as the difference in the path length of object radiation and reference radiation practically does not change here as a result of the insertion of this coupling-out beam splitter cube.

Thus, in real time with respect to the interferogram recording, the form of the illumination of the pupil plane, that is to say the intensity distribution in the pupil surface, is also detectable, which usually coincides with Fourier plane of the object-imaging lens. The illumination of said pupil plane is largely determined by object properties such as, for example, surface gradient and microstructure of the scanned object and thus also includes very essential information about the characteristic of the measured object point. Thus, in particular, not very cooperative measurement points of the object or measured points having particular features such as object edges can be clearly identified, correspondingly classified and supplied for further processing or rejection.

The information from the illumination of the pupil plane and spatial interferogram of one or more object points in a concrete measurement situation can be combined for more comprehensive description of the object by means of a model.

In this case, therefore, the reference radiation of the interferometer is clearly masked out, which is possible comparatively simply by means of this arrangement with lateral shear. This relatively simple obtaining of the pupil illumination constitutes a very particular advantage of this arrangement according to the invention and, in the case of known scanning white light interferometers, rather cannot be realized or can be realized only with very considerable technical outlay, for example for the compensation of the optical paths and the dispersion in a white light interferometer, in real time.

The absolutely simultaneous obtaining of the pupil illumination and of the spatial interferogram is absolutely necessary in measurements of rough or three-dimensionally finely structured surfaces in an environment also with comparatively small vibration amplitudes, wherein a pulsed or flashed light source can be used here. In the case of vibrations, the pupil illumination and the spatial interferogram can change to a considerable extent rapidly and significantly, that is to say also in a time duration of less than ten milliseconds, particularly if speckle also occurs in the optical signals.

A method and an arrangement also are provided for robust interferometry for detecting distance, depth, profile, form, undulation and flatness deviation on technical, reflective objects, in particular polished or ultraprecision-processed glass and metal surfaces. The arrangement is described below. In this case, the following means are used:

- a monochromatic or quasi-monochromatic source of electromagnetic radiation for illuminating the object,
- an interferometer, in particular also in the form of an interference microscope, having an object beam path and having at least one reference beam path, in which at least one end reflector is arranged, and a measurement plane in the object beam path, in which measurement plane the surface or volume elements of the object which are to be optically measured are at least approximately situated,
- and at least one line-scan detector for detecting electromagnetic radiation in the form of at least one spatial interferogram.

The source of electromagnetic radiation is also designated hereinafter as light source, wherein light is understood here within the meaning of electromagnetic radiation from terahertz through IR, VIS to UV radiation.

The light source therefore constitutes a monochromatic or quasi-monochromatic light source, for example a laser light source.

The light source can generate a laterally finely structured illumination pattern on the object. In this case, the light source can constitute a point emitter, a lateral line emitter or a group of point emitters in line or matrix form also with individually switchable punctiform or linear luminous elements.

According to the invention, at least one end reflector having three plane mirrors as reference reflector, that is to say at least one three-plane-mirror reference end reflector, is arranged in the reference beam path of the interferometer and the surfaces of these three plane mirrors in each case lie at least approximately perpendicular to a common reference plane BE.

In this case, the three trace lines of the planes which are represented by the surfaces of the three plane mirrors form a triangle ABC in the reference plane BE, in order that there is a lateral shear between reference beam and object beam in this interferometer, said lateral shear representing a path having the absolute value delta_q. The paths AB, BC and CA of said triangle ABC have to have a certain length for this purpose. By way of example, the length of these paths can in each case typically be of the order of magnitude of a few tenths of a millimeter up to a few millimeters mm. In this case, the angles of said triangle are not extremely acute, nor does said triangle constitute a right-angled triangle. The resulting lateral shear can have an absolute value delta_q of the order of magnitude typically of 0.1 mm up to a few millimeters. In the case of an arrangement having a microscope with high lateral resolution and having a centroid wavelength in the UV range, however, the absolute value delta_q can also be of the order of magnitude of a few hundredths of a millimeter. This is based on correspondingly small lengths of the paths AB, BC and CA and the corresponding three angles of the triangle ABC. This approach can be scaled widely with regard to the absolute value delta q.

The lateral shear having the absolute value delta q between reference beam and object beam exists in the virtual mirror plane VSE of the three-plane-mirror reference end reflector in the reference beam path. The virtual mirror plane VSE is at least approximately optically conjugate with the measurement plane ME of the object beam path by virtue of beam splitting. In this case, the three-plane-mirror reference end reflector is angularly oriented such that electromagnetic radiation from the reference beam path reaches the line-scan detector.

A lateral displacement of a three-plane-mirror reference end reflector does not lead to a change in the absolute value of the lateral shear delta q. This invariance is regarded as a major technical advantage since this results in high robustness of the signal production in relation to such misalignments.

The three-plane-mirror reference end reflector is a reflector that generates lateral shear in the interferometer according to the invention. In this case, the three-mirror reference end reflector, as already explained, has a virtual mirror plane VSE. The occurrence of the lateral shear can be spatially assigned to said virtual mirror plane VSE. By way of example, the interference of an object spherical wave and a reference spherical wave, which are generated by the interferometer and the sphere centers of which are separated by a lateral shear of the absolute value delta q, at least in a delimited partial region of the detector plane, leads to a spatial interferogram having an at least approximately constant spatial frequency for the centroid wavelength, since the interfering wave surfaces on the detector are inclined with respect to one another. In a delimited segment of the spherical wave surfaces, the latter can generally be approximated sufficiently well by plane waves. This interference phenomenon of two spatially coherent spherical wave surfaces that is to be registered on a detector is sufficiently known to the person skilled in the art in optics as Young's classic double-slit experiment, wherein the distance d between the slits in the double-slit experiment here corresponds to the lateral shear having the absolute value delta q.

The lateral shear having the absolute value delta q therefore serves here as a basis for the generation of one or a plurality of spatial interferograms which, in terms of their fringe spacing, should not be influenced or should be influenced only very insignificantly by the inclination of the object surface if the punctiform center of the object spherical wave lies on a surface element, that is to say that the object is also illuminated at least approximately in a punctiform manner by focused light. This invariance of the fringe spacing is very highly advantageous for the evaluation of spatial interferograms since here, for example, on account of the prior knowledge of the fringe spacing in the signal, robust and comparatively fast lock-in approaches for determining the phase angle of the spatial interferogram can be employed, which are at least approximately set to the spatial frequency of the spatial interferogram, which is at least approximately known beforehand. In order to determine the phase angle of the spatial interferogram, however, it is also possible to use comparatively simple phase evaluation approaches such as the 5-phase evaluation algorithm according to J. Schwider. However, it is also possible to employ phase evaluation algorithms which compute in terms of the order of magnitude 100 intensity values to a phase value modulo 2 PI.

On the line-scan detector, a spatial interferogram is preferably detected for each object point in a laterally extended region, such that a complete line profile can be obtained by recording a single image with preferably many juxtaposed spatial interferograms, which are formed by beam shaping, and the evaluation thereof.

This arrangement can be used particularly advantageously if the intention is to measure polished flat or weakly curved objects in an oscillating environment in a very short time, where the interferometric approach with temporal phase shifting cannot be used and only a few measurement points, for example along a line, suffice for testing. The measurement is particularly simple here if there is a priori knowledge about the measurement object, a continuous surface thereof can be assumed and the typical, expected deviations from the desired geometry are of the order of magnitude of the light wavelength used or considerably less than that or the deviations from the desired geometry change only very little laterally over the measurement object.

A method and an arrangement further are provided for robust interferometry for detecting distance, depth, profile, form, undulation and flatness deviation on technical, reflective objects, in particular polished or ultraprecision-processed glass and metal surfaces. The arrangement is described below. In this case, the following means are used:

a monochromatic or quasi-monochromatic source of electromagnetic radiation and also a source of short-coherent electromagnetic radiation for illuminating the object, an interferometer, in particular also in the form of an interference microscope, having an object beam path and having at least one reference beam path, in which at least one end reflector is arranged, and a measurement plane in the object beam path, in which measurement plane the surface or volume elements of the object which are to be optically measured are at least approximately situated, and at least one line-scan detector for detecting electromagnetic radiation in the form of at least one spatial interferogram.

The source of electromagnetic radiation is also designated hereinafter as light source, wherein light is understood here within the meaning of electromagnetic radiation from terahertz through IR, VIS to UV radiation.

The light source constitutes a monochromatic or quasi-monochromatic light source, for example a laser light source. In addition, a source of short-coherent electromagnetic radiation for illuminating the object is also arranged. This wavelength is dominant in the overall spectrum. At this wavelength, the aberrations of the optical arrangement, in particular in the pupil of the optical system for object imaging, have a minimum.

The light source can generate a laterally finely structured illumination pattern on the object. In this case, the light source can constitute a point emitter, a lateral line emitter or a group of point emitters in line or matrix form also with individually switchable punctiform or linear luminous elements.

According to the invention, at least one end reflector having three plane mirrors as reference reflector, that is to say at least one three-plane-mirror reference end reflector, is arranged in the reference beam path of the interferometer and the surfaces of these three plane mirrors in each case lie at least approximately perpendicular to a common reference plane BE.

In addition, in the arrangement means for spectral splitting are provided in the detection beam path, such that spatial interferograms are separated according to wavelength. The known approach for spectral interferometry is employed here. Thus, it is also possible to separate the spatial interferogram of the light source with monochromatic or quasi-monochromatic radiation on the line-scan detector for highly accurate phase evaluation. At the same time, spatial interferograms having different wavelengths are present separately, such that a multi-wavelength approach can be used for evaluation. By addition of a plurality of spatial interferograms having different wavelengths, it is possible to calculate a numerically generated short-coherence interferogram and provide it in a known manner for evaluation. Thus, by means of short-coherence interferogram or multi-wavelength technology, it is possible to determine the absolute fringe order or a reference fringe in the spatial interferogram pattern. The spatial interferogram of the light source with monochromatic or quasi-monochromatic radiation is used to numerically determine the phase angle for determining extremely accurate depth or distance information at a measurement point. This concerns the extremely accurate measurement on polished or ultraprecision-processed surfaces, that is to say resolution and measurement uncertainty in the sub-lambda range, for example for form measurement on optical systems in the EUV range.

According to the invention, the three trace lines of the planes which are represented by the surfaces of the three plane mirrors form a triangle ABC in the reference plane BE, in order that there is a lateral shear between reference beam and object beam in this interferometer, said lateral shear representing a path having the absolute value delta_q. The paths AB, BC and CA of said triangle ABC have to have a certain length for this purpose. By way of example, the length of these paths can in each case typically be of the order of magnitude of a few tenths of a millimeter up to a few millimeters mm. In this case, the angles of said triangle are not extremely acute, nor does said triangle constitute a right-angled triangle. The resulting lateral shear can have an absolute value delta_q of the order of magnitude typically of 0.1 mm up to a few millimeters. In the case of an arrangement having a microscope with high lateral resolution and having a centroid wavelength in the UV range, however, the absolute value delta_q can also be of the order of magnitude of a few hundredths of a millimeter. This is based on correspondingly small lengths of the paths AB, BC and CA and the corresponding three angles of the triangle ABC. This approach can be scaled widely with regard to the absolute value delta_q.

The lateral shear having the absolute value delta_q between reference beam and object beam exists in the virtual mirror plane VSE of the three-plane-mirror reference end reflector in the reference beam path. The virtual mirror plane VSE is at least approximately optically conjugate with the measurement plane ME of the object beam path by virtue of beam splitting. In this case, the three-plane-mirror reference end reflector is angularly oriented such that electromagnetic radiation from the reference beam path reaches the line-scan detector.

A lateral displacement of a three-plane-mirror reference end reflector does not lead to a change in the absolute value of the lateral shear delta_q. This invariance is regarded as a major technical advantage since this results in high robustness of the signal production in relation to such misalignments.

The three-plane-mirror reference end reflector is a reflector that generates lateral shear in the interferometer according to the invention. In this case, the three-mirror reference end reflector, as already explained, has a virtual mirror plane VSE. The occurrence of the lateral shear can be spatially assigned to said virtual mirror plane VSE. By way of example, the interference of an object spherical wave and a reference spherical wave, which are generated by the interferometer and the sphere centers of which are separated by a lateral shear of the absolute value delta_q, at least in a delimited partial region of the detector plane, leads to a spatial interferogram having an at least approximately constant spatial frequency for the centroid wavelength, since the interfering wave surfaces on the detector are inclined with respect to one another. In a delimited segment of the spherical wave surfaces, the latter can generally be approximated sufficiently well by plane waves. This interference phenomenon of two spatially coherent spherical wave surfaces that is to be registered on a detector is sufficiently known to the person skilled in the art in optics as Young's classic double-slit experiment, wherein the distance d between the slits in the double-slit experiment here corresponds to the lateral shear having the absolute value delta_q.

The lateral shear having the absolute value delta_q therefore serves here as a basis for the generation of one or a plurality of spatial interferograms which, in terms of their fringe spacing, should not be influenced or should be influenced only very insignificantly by the inclination of the object surface if the punctiform center of the object spherical wave lies on a surface element, that is to say that the object is also illuminated at least approximately in a punctiform manner by focused light. This invariance of the fringe spacing is very highly advantageous for the evaluation of spatial interferograms since here, for example, on account of the prior knowledge of the fringe spacing in the signal, robust and comparatively fast lock-in approaches for determining the phase angle of the spatial interferogram can be employed, which are at least approximately set to the spatial frequency of the spatial interferogram, which is at least approximately known beforehand. In order to determine the phase angle of the spatial interferogram, however, it is also possible to use comparatively simple phase evaluation approaches such as the 5-phase evaluation algorithm according to J. Schwider. However, it is also possible to employ phase evaluation algorithms which compute in terms of the order of magnitude 100 intensity values to a phase value modulo 2 PI.

On the line-scan detector, a spatial interferogram of the light source with monochromatic or quasi-monochromatic radiation and spatial short-coherence interferograms, which are spatially separated by the spectral means in the detection beam path, are preferably detected for each object point in a laterally extended region, such that clear and extremely accurate depth or distance information can be obtained by recording a single image with preferably many juxtaposed spatial interferograms, which are formed by beam shaping.

This arrangement can be used particularly advantageously if the intention is to measure polished flat or weakly curved objects in an oscillating environment in a very short time, where the interferometric approach with temporal phase shifting cannot be used and only a few measurement points, for example along a line, suffice for testing. The measurement is particularly simple here if there is a priori knowledge about the measurement object, a continuous surface thereof can be assumed and the typical, expected deviations from the desired geometry are of the order of magnitude of the light wavelength used or considerably less than that or the deviations from the desired geometry change only very little laterally over the measurement object.

The method for robust interferometry for detecting distance, depth, profile, form, undulation and/or roughness or the optical path length in or on technical or biological objects, including in layered form, or else for optical coherence tomography (OCT), using the means in the preamble of the arrangement also may include the following method steps:
generating at least one object beam of rays of electromagnetic radiation for illuminating the object,
generating at least one reference beam of rays by means of beam splitting in an interferometer,
generating spatial short-coherence interferences of object and reference rays,
detecting spatial short-coherence interferences on a line-scan detector of electromagnetic radiation,
are carried out.

According to the invention,
in the reference beam path three, directly successive reflections are carried out at three respective plane mirrors.
In this case the surfaces of said three plane mirrors in each case lie at least approximately perpendicular to a common reference plane BE and thus form a three-plane-mirror reference end reflector.
The three reflections introduce a lateral shear having the absolute value delta_q between object beam of rays and reference beam of rays in the interferometer, as a result of which at least one spatial short-coherence interferogram is generated on the line-scan detector.
A spectral splitting of object radiation and reference radiation is carried out in the detection beam path.
At least one spatial interferogram pattern with spectral splitting is detected and evaluated in order to obtain information about distance, depth, profile, form, undulation and/or roughness or the optical path length of an object, including in optical coherence tomography.

It is thus possible to spectrally select spatial interferograms in a targeted manner. By way of example if a laser diode is assigned to the source of short-coherent radiation. As a result, in a spectral range in which the aberrations of the optical system are a minimum, the phase angle of the interferogram can be determined highly accurately. The interferograms of other spectral ranges serve for determining the zeroth-order fringe.

A method for robust, in particular wide-scale, interferometry in particular according to one of the methods described above and/or below, in particular in accordance with one of the preferred embodiments described, is provided for detecting distance, depth, profile, form, undulation and/or roughness or the optical path length in or on technical or biological objects, including in layered form, including for detecting one or more air clearances in optical systems, or else for optical coherence tomography (OCT).

This method for robust interferometry uses the following means:
at least one source of short-coherent electromagnetic radiation for illuminating the object, in particular also in the form of a frequency comb laser cavity disposed upstream of the interferometer and having the single optical length L or/and at least one multi-beam interference cavity disposed downstream of the source (in particular a spectrally broadband light source) in the light path and having the single optical length L,
an interferometer, in particular also in the form of an interference microscope, having an object beam path and having at least one reference beam path, in which at least one end reflector, in particular of the type described above and/or below, is arranged, and having a measurement plane or a measurement volume in the object beam path, in which the surface or volume elements of the object which are to be optically measured are at least approximately situated,
and at least one line-scan detector for detecting electromagnetic radiation.

In this case, the following method steps are carried out:
generating at least one object beam of rays of electromagnetic radiation by means of beam splitting in an interferometer for illuminating the object,
generating at least one reference beam of rays by means of beam splitting in an interferometer,
generating a lateral offset delta_q for the reference beam of rays,
generating spatial superimpositions of object and reference rays by beam combining, detecting spatial superimpositions of object and reference rays on a line-scan detector of electromagnetic radiation. In the case of interference, two mutually inclined wavefronts on the detector form a spatial short-coherence interferogram.

According to the invention, at the instant t i a first superimposition of object radiation and reference radiation and a first detection of superimposed object radiation and reference radiation by means of line-scan detector are carried out and subsequently either a relative movement in the direction of light propagation between the interferometer and the object or a movement of the end reflector in the reference beam path in the direction of light propagation or an optical length change delta_L of at least one frequency comb laser cavity disposed upstream of the interferometer or/and of at least one multi-beam interference cavity disposed downstream of the source in the light path is carried out in the time duration delta_tz, wherein the adjusting distance s of the relative movement between the interferometer and the object or the adjusting distance s of the movement of the end reflector in the reference beam path or the optical length change delta_L of at least one frequency comb laser cavity disposed upstream of the interferometer or/and of at least one multi-beam interference cavity disposed downstream of the source in the light path in the time duration delta_tz is at least half the absolute value of the centroid wavelength lambda_cent and the spatial change delta_xr_max in the optical path difference xr in the superimposition region of object radiation and reference radiation on the line-scan detector has at least the whole absolute value of the centroid wavelength lambda_cent of the interfering radiation. The wavefronts which represents the object radiation and reference radiation are inclined with respect to one another on the line-scan detector. Preferably, the inclination angle between the wavefronts is a few tenths of a degree.

After the time duration delta tz at the instant t i+1 at least one second superimposition of object radiation and reference radiation and at least one second detection of superimposed object radiation and reference radiation by means of line-scan detector are carried out.

As a result, in the case of the occurrence of a spatial short-coherence interferogram, the displacement of the spatial interferogram after the time duration delta_tz on the line-scan detector is at least a period length of said interferogram. In a typical measurement, the stepwise displacement of the spatial interferogram—in each case after the time duration delta_tz—is preferably of the order of magnitude of 10 to 100 periods of the spatial interferogram in order thus to be able to scan comparatively rapidly even a relatively large depth range in the object space. What is important for measurements with a short coherence length of the interfering radiation is that the well-modulated part of the spatial interferogram with the maximum of the modulation can be detected at least once in a plurality of detections by a frame of the line-scan detector.

The movement or adjusting operations for length change are therefore always continued until at least one evaluatable spatial interferogram of relevant object points can be detected or the movement or adjusting operations cannot be carried out any further for spatial or temporal technical reasons. The fact of whether a spatial interferogram forms on the line-scan detector is determined in each case also by the respective current optical path difference that forms on the line-scan detector and the coherence length of the radiation superimposed there.

Two cases, case 1, and case 2, should be considered here. Case 1 is applicable if the coherence length of the interfering radiation is less than the spatial change in the optical path difference in the spatial interferogram on the line-scan detector or the coherence length is equal to the spatial change in the optical path difference. At least the well-modulated part of a short-coherence interferogram can then be recorded completely in a detector frame.

Case 2 describes the substantive matter that the coherence length is greater than the spatial change in the optical path difference of the short-coherence interferogram that forms on the line-scan detector. The highly modulated part of said interferogram then cannot be completely detected by means of a single detector frame. By means of a plurality of successive recordings of a spatial interferogram by means of a line-scan detector—in each case after a movement or adjusting operation for length change which takes place in the time duration delta_tz—the position of the maximum of the envelope can in this case be determined at least approximately from a plurality of detector frames. This is advantageous if the intention is to measure more distant objects on the macroscopic scale and a lower measurement resolution, for example of the order of magnitude of 10 μm, is acceptable here for the object distance.

In case 1 it is advantageous if the adjusting distance s or the change in the optical length delta_L generally does not exceed one quarter of the change in the optical path difference of the spatial interferogram recorded on the line-scan detector, in order that in the measurement operation each cooperative object point can yield at least one spatial interferogram which can be evaluated comparatively well. There can be exceptions if comparatively certain a priori information about the object form is available, for example during the measurement of objects manufactured with small form tolerances. By way of example, only the thus sufficiently accurately known desired positions of the object surfaces are then optically approached, from the object points of which well-modulated spatial interferograms can then immediately be obtained, if appropriate. Thus, with a degree of certainty the maximum of the envelope can be detected comparatively rapidly and the form measurement of a complexly formed object can be carried out rapidly.

For case 2 it is advantageous if the adjusting distance s or the change in the optical length delta_L generally does not exceed one quarter of the coherence length of the detected radiation, in order that in the measurement operation each cooperative object point can yield at least one spatial interferogram that can be evaluated comparatively well. Thus, the position of the maximum of the envelope or the centroid thereof can be determined sufficiently accurately. In this case, it is assumed that the coherence length, as a variable that generally tends not to vary very much, is at least approximately known or can be determined sufficiently accurately from a previously recorded spatial interferogram.

If the coherence length of the detected radiation is equal or at least approximately equal to the absolute value of the change in the optical path difference of the superimposed radiation on the detector, the adjusting distance s or the change in the optical length change delta_L should generally not exceed one quarter of said change in the optical path difference of the superimposed radiation on the detector. In that case, the displacement of the maximum of the envelope of a spatial interferogram, that is to say if a spatial interferogram—owing to the magnitude of the absolute optical path difference of the superimposed radiation—occurs, per adjusting or movement operation is not greater than half the length of the line-scan detector. This makes finding the maximum of the envelope of a spatial interferogram and thus evaluating the same comparatively simple.

When using a frequency comb laser cavity or a multi-beam interference cavity, as is known the delay length of the frequency comb laser cavity or double the optical length of the multi-beam interference cavity is to be made at least approximately equal to an integral fraction or the total optical path difference in the interferometer—relative to object points in the measurement plane or in the measurement volume, in order to be able to obtain a short-coherence interferogram. As is known, these components having a frequency comb characteristic make it possible, even from more distant object points, still to generate and record a short-coherence interferogram. Thus, even more distant macroscopic objects can be optically scanned by means of the tuning of a frequency comb laser cavity or a multi-beam interference cavity. In this case, an object point should be respectively situated in the physical-optical depth of view (DOV) range of a focus in the object beam path. If object points that are intended to be measured are situated outside the given physical-optical depth of view range, refocusing is required in this case.

This therefore concerns, in particular, a method for robust, in particular wide-scale, interferometry with at least one source of short-coherent electromagnetic radiation for illuminating the object, in particular also in the form of a frequency comb laser cavity or/and at least one multi-beam interference cavity disposed downstream of the source in the light path. In this case, in particular, a first superimposition of object radiation and reference radiation inclined with respect to each other and a first detection of this superimposed object radiation and reference radiation by means of the line-scan detector are carried out. Afterward, in particular, either a relative movement between the interferometer and the object or a movement of the end reflector in the reference beam path in each case in the direction of light propagation or an optical length change of a frequency comb laser cavity disposed upstream of the interferometer or/and a multi-beam interference cavity disposed downstream of the source in the light path are carried out in a time duration delta_tz. In this case, the adjusting distance during the relative movement, during the movement of the end reflector or the optical length change in the time duration delta_tz is, in particular, at least half the absolute value of the centroid wavelength of the radiation superimposed on the line-scan detector. After the time duration delta_tz, in particular, at least one second superimposition of object radiation and reference radiation and at least one second detection of the superimposed object radiation and reference radiation by means of the line-scan detector are carried out in order, in particular, to detect at least one spatial interferogram with its modulation maximum.

Preferably, in the method for robust, in particular wide-scale, interferometry, the adjusting distance s or the optical length change delta_L in the time duration delta_tz has at least approximately in each case the absolute value of one quarter of the maximum spatial change delta_xr_max of the optical path difference xr of the spatial interferogram recorded on the line-scan detector.

Preferably, in the method for robust, in particular wide-scale, interferometry, the relative movement between the interferometer and the object in the time duration delta_tz is carried out continuously, quasi-continuously or in a stepwise manner.

Preferably, in the method for robust, in particular wide-scale, interferometry, the movement of the end reflector in the time duration delta_tz is carried out continuously, quasi-continuously or in a stepwise manner.

Preferably, in the method for robust, in particular wide-scale, interferometry, the optical length change delta_L in the time duration delta_tz is carried out continuously, quasi-continuously or in a stepwise manner.

A further aspect is concerned with an arrangement, that is to say a device, in which individual components are arranged in the manner described, for robust, in particular wide-scale, interferometry, in particular according to one of the embodiments described above and/or below, in particular in accordance with one of the preferred embodiments described, for detecting distance, depth, profile, form, undulation and/or roughness or the optical path length in or on technical or biological objects, including in layered form, including for detecting one or more air clearances in optical systems, or else for optical coherence tomography (OCT). Particularly preferably, the arrangement is designed to carry out a method according to the invention, in particular in one of the preferred configurations described. For this purpose, the arrangement preferably comprises corresponding means designed to carry out the respective method steps or to have the requisite functionality.

In this aspect, the arrangement for robust interferometry comprises the following means:

- at least one source of short-coherent electromagnetic radiation for illuminating the object, in particular also in the form of a frequency comb laser cavity disposed upstream of the interferometer and having the single optical length L or/and at least one multi-beam interference cavity disposed downstream of the source in the light path and having the single optical length L,
- an interferometer, in particular also in the form of an interference microscope, having an object beam path and having at least one reference beam path, in which at least one end reflector, in particular of the type described above and/or below, is arranged, and having a measurement plane or a measurement volume in the object beam path, in which the surface or volume elements of the object which are to be optically measured are at least approximately situated,
- and at least one line-scan detector for detecting electromagnetic radiation, and
- means for tuning the frequency comb laser cavity or/and the multi-beam interference cavity in the spectral space.

In particular, the means for tuning the frequency comb laser cavity or/and the multi-beam interference cavity can be provided as means for carrying out an optical length change delta_L of at least one frequency comb laser cavity disposed upstream of the interferometer or/and at least one multi-beam interference cavity disposed downstream of the source (in particular a spectrally broadband light source) in the light path.

Preferably, there are provided or arranged means for temporal synchronization for carrying out an optical length change delta_L of at least one frequency comb laser cavity disposed upstream of the interferometer or/and of at least one multi-beam interference cavity disposed downstream of the source in the light path with the image recording by means of line-scan detector.

BRIEF DESCRIPTION OF THE DRAWINGS

FIG. 4 illustrates a three-plane-mirror reference end reflector having plane mirrors in M-form according to the invention.

FIG. 5 illustrates a three-plane-mirror reference end reflector having plane mirrors on the basis of an acute triangle of three trace lines according to the invention.

FIG. 19 illustrates another embodiment of the Michelson-type interferometer for one-point scanning of FIG. 17.

FIG. 20 illustrates the resulting interference patterns of the Michelson-type interferometer for one-point scanning of FIG. 19.

DETAILED DESCRIPTION OF THE PREFERRED EMBODIMENTS

The term light is always used herein as a synonym for electromagnetic radiation from the terahertz through infrared to deep UV spectrum.

Figure 1:
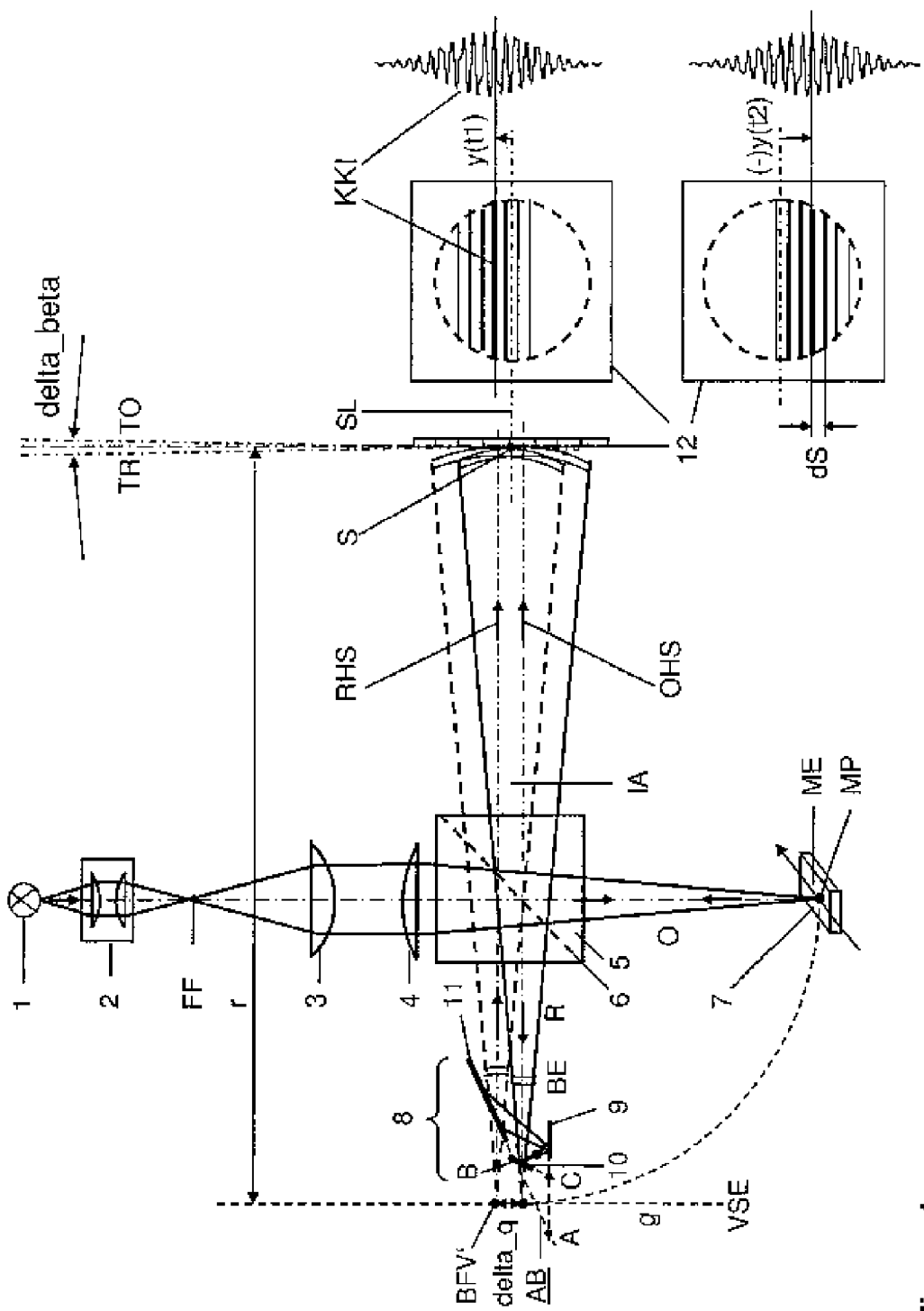
FIG. 1 is a sensor on the basis of a Michelson interferometer in according to the invention.

FIG. 1 shows a sensor on the basis of a Michelson interferometer. The light from a spectrally comparatively broadband light source 1 in the near infrared range is brought to a small focal spot FF by means of a beam shaping optical system 2, it also being possible to arrange a pinhole here, is collimated by a lens 3 and is focused again by a comparatively small-aperture focusing lens 4 having a numerical aperture of 0.05 and subsequently passes into a Michelson-type interferometer comprising a beam splitter 5 and a beam splitter surface 6, where the light is split into a reference beam R and an object beam O. The object light beam O passing rectilinearly through the beam splitter 5 impinges on the reflective object surface of the object 7 in a manner focused at the measurement point MP, said surface being situated here almost in the measurement plane ME. The object surface is intended to be situated within the physical-optical depth of view range of the focused light. The light returning from the object 7 is directed in the direction of the line-scan detector 12 at the beam splitter surface 6 by reflection via the interferometer output IA. The object chief ray OHS is illustrated. The light which is reflected into the reference beam path R at the beam splitter 5 after entering into the interferometer passes to a three-plane-mirror reference end reflector 8, which consists of the three plane mirrors 9, 10 and 11, which are in each case perpendicular to the reference plane BE, which here is intended to lie in the plane of the drawing. The three plane mirrors 9, 10 and 11 constitute an intrinsically rigid, compact assembly. The position of the three plane mirrors 9, 10 and 11 is always regarded hereinafter as invariable with respect to one another.

The three trace lines of the three planes which are spanned by the three surfaces of the plane mirrors 9, 10 and 11 and which arise as a result of the intersection of said planes with the reference plane BE here form an obtuse triangle ABC in the reference plane BE. AB here represents a part of the trace line represented here by the plane of the plane mirror surface 11.

At the three-plane-mirror reference end reflector 8, the incident reference beam of rays experiences a lateral shear of the absolute value delta q. The location at which the lateral shear arises is assigned to the virtual mirror plane VSE. The virtual mirror plane VSE represents the virtual reflection plane of said three-plane-mirror reference end reflector 8 and arises from the position of the three-plane-mirror reference end reflector 8 in space and is assembly-fixed if the three-plane-mirror reference end reflector 8 is regarded as a monolithic assembly. The straight line g represents the trace line between the plane BE and the virtual mirror plane VSE, wherein the virtual mirror plane VSE is perpendicular to the reference plane BE. In this case, relative to the interferometer output IA, the virtual mirror plane VSE is intended to represent an optical conjugate plane with respect to the measurement plane ME of the object beam path, which is achieved by alignment of the interferometer. The reference beam of rays reflected at the three-plane-mirror reference end reflector 8, represented by the reference chief ray RHS, leaves the interferometer after rectilinearly passing through the beam splitter 5 with the beam splitter surface 6 via the interferometer output IA, likewise passes to the line-scan detector 12, and interference with the light from the object beam path occurs there. This gives rise to a spatial interferogram on the line-scan detector 12 with an at least approximately constant spatial frequency for the centroid wavelength, since the spherical waves interfering there are comparatively far away from their centers and the line-scan detector 12 has only a comparatively small area. In this case, the relationships during the interference correspond, given sufficiently small focal points to those in Young's double-slit experiment with two pinholes. The angle between the tangential planes TR and TO of reference and object spherical waves form an angle delta beta at the piercing point of the line of symmetry SL in the plane of the drawing, from which angle the fringe spacing dS for the centroid wavelength lambda_cent results at least approximately as $$dS = (\text{Lambda\_cent} * r)/\text{delta}\_q \quad (1)$$

if r represents the distance of the midpoints of the two spherical waves from reference and object beam paths from the detection plane on the detector 12, wherein the center of the spherical wave in the reference beam path coincides with the virtual beam focus BFV'.

In the interferometer, the optical path difference can be made almost zero for all wavelengths if an almost perfect beam splitter cube having identical optical path lengths is used here. However, relatively small deviations of the two optical path lengths in the cube in the range of a few micrometers can generally still be tolerated well and lead, in the spatial interferogram on the line-scan detector 12, not only to a constant lateral displacement of the interferogram wavelet but additionally to an asymmetry of the envelope. However, that can be taken into account by the algorithms of the evaluation. By displacing the three-plane-mirror reference end reflector 8, it is possible to position the centroid of the interferogram wavelet centrally on the line-scan detector 12.

In the interferometer illustrated here, the optical path difference is not exactly zero at an instant t1 as a result of a small offset of the reflective surface of the object 7 from the measurement plane ME. This gives rise to a spatial short-coherence interferogram KKI having a maximum of the absolute value y(t1), said maximum being laterally displaced somewhat with respect to the line of symmetry SL of the two chief rays. If the object surface of the object 7 is situated in a different depth position at the instant t2, this gives rise to a maximum of the spatial short-coherence interferogram in the form of a wavelet, said maximum being displaced laterally by the absolute value (−)y(t2).

This arrangement of a three-plane-mirror reference end reflector 8 in the form that the triangle ABC of the trace lines is obtuse affords the advantage that the angles of incidence on the three plane mirrors for the chief ray of the reference beam can be chosen in each case so as to avoid excessively large angles of incidence, that is to say grazing incidence, also for marginal rays of a focused beam.

The illustration here does not show means for areal illumination of the object 7 and means for areal imaging of the object 7 onto a further camera in order to be able to approach relative measurement positions by means of a sensor actuator system. That is prior art and is assumed in all arrangements below.

Figure 2:
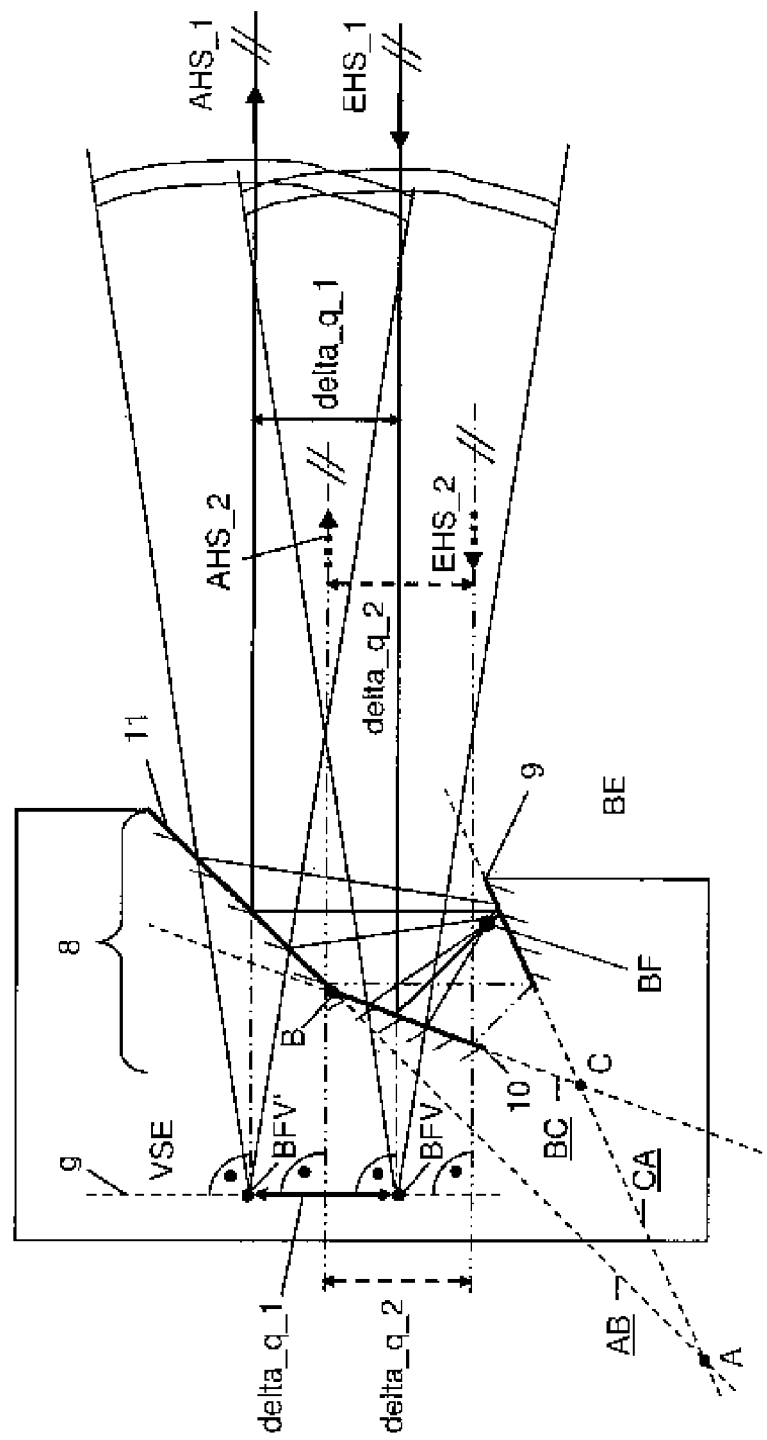
FIG. 2 illustrates a three-plane-mirror reference end reflector according to the invention.

FIG. 2 illustrates the three-plane-mirror reference end reflector 8 having the three plane mirrors 9, 10 and 11, the trace lines of which form the triangle ABC. Said trace lines arise as a result of the intersection of the planes spanned by the surfaces of the plane mirrors 9, 10 and 11 with the reference planes BE, which here coincides with the plane of the drawing.

In this case, the three plane mirrors 9, 10 and 11 are produced by single-point diamond processing.

The three-plane-mirror reference end reflector 8 corresponds to a virtual plane mirror in the virtual mirror plane VSE. Said virtual plane mirror generates a lateral shear delta_q in the virtual plane mirror VSE. In terms of depth, that is to say the distance from the beam splitter cube 5, the three-plane-mirror reference end reflector 8 is in this case arranged by alignment such that the beam focus BF of an incident homocentric beam 1 with the incident chief ray EHS_1 lies on the virtual mirror plane VSE as virtual focal point BFV. In addition, the chief ray EHS_1 is intended to be incident perpendicularly on the virtual mirror plane VSE. As a result of the lateral shear, said virtual focal point BFV experiences a displacement by the absolute value delta_q_1 and then arises virtually as BFV'. The return of the light in the direction of beam splitter cube 5 and interferometer output IA begins apparently proceeding from the virtual focal point BFV'. In this case too, the chief ray of the emergent beam AHS_1 is perpendicular to the virtual mirror plane VSE.

In this case, it is advantageous that the real focal point BF of the homocentric beam 1, or the midpoint of a spherical wave, does not lie on one of the plane mirror surfaces 9 or 10, but rather arises in air. Consequently, the fine microstructure generally existing here on the plane mirror surfaces as a result of the diamond micromachining also cannot be imaged sharply onto the detector 12, particularly if this plane mirror surface lies significantly outside the physical-optical depth of view. The light scattering that arises as a result of this fine microstructure is eliminated in the further beam path by a confocal discrimination.

For a parallel-offset beam having the chief rays EHS_2 and AHS_2, the absolute value of the lateral shear is delta_q_2. Given perfect plane mirrors and in each case a perpendicular position with respect to the reference plane BE, the following holds true here: the absolute value of the lateral shear delta_q is equal to the absolute value delta_q_1 and is also equal to the absolute value delta_q_2, and the following thus holds true:

$$\text{delta}\_q\_1 = \text{delta}\_q\_2 = \text{delta}\_q \quad (2)$$

and there is an invariance of the absolute value of the lateral shear delta q with respect to a variable beam incidence height.

Figure 3:
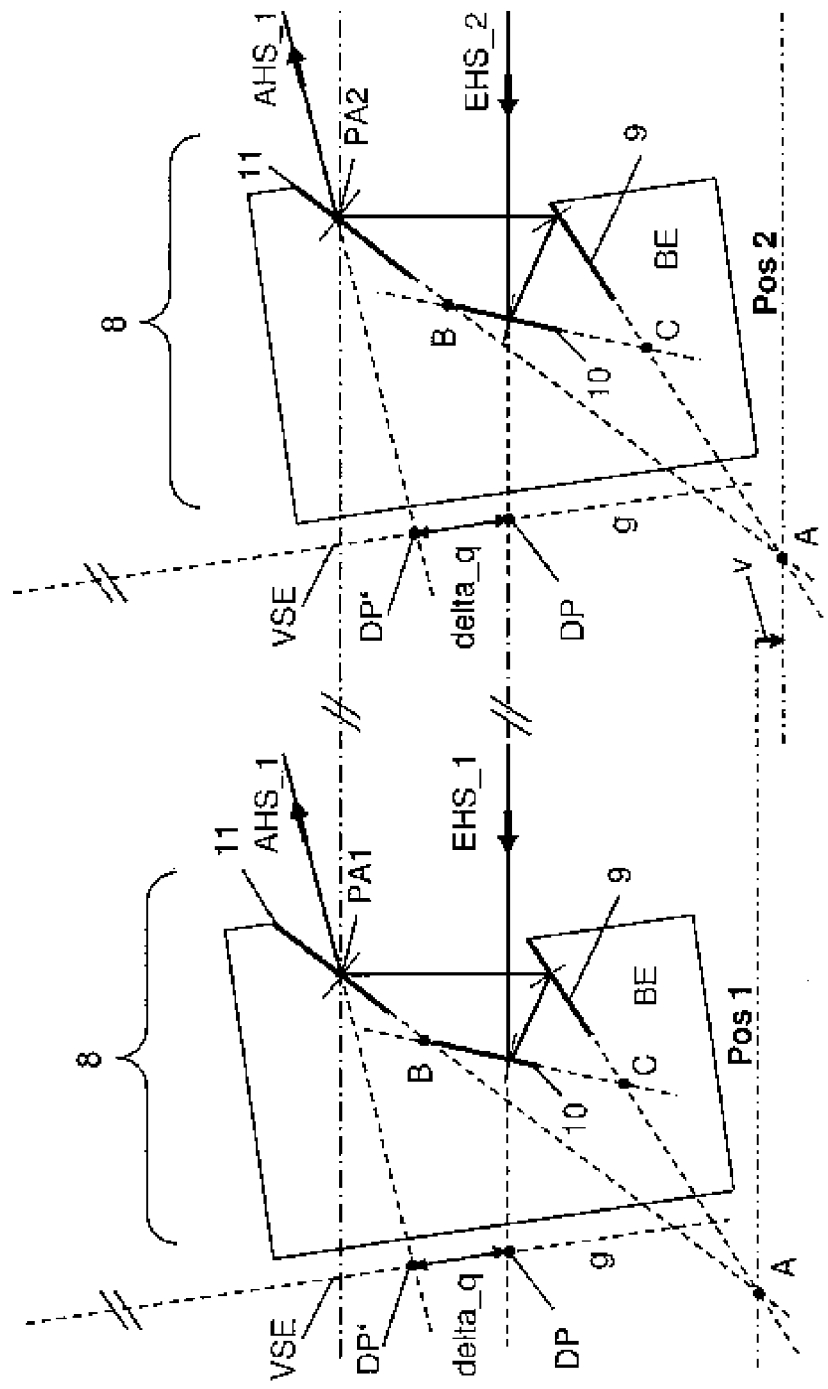
FIG. 3 illustrates a three-plane-mirror reference end reflector in which the lateral shear is in a distinguished plane according to the invention.

FIG. 3 shows that, in the case of a three-plane-mirror reference end reflector 8, the lateral shear delta q always takes place in a distinguished plane, the virtual mirror plane VSE. This path representing the lateral shear having the absolute value delta_q is invariable in terms of absolute value and is determined by the distance between the ray piercing points DP and DP' in the virtual mirror plane VSE. Said virtual mirror plane VSE is positionally fixed in an intrinsically rigid three-plane-mirror reference end reflector 8. The three-plane-mirror reference end reflector 8 illustrated on the right is displaced by the distance v relative to the one illustrated on the left and, nevertheless, no movement of the output beam can be observed within the scope of accuracy in the drawing since PA1 and PA2 are at the same height. This shows the invariance of a three-plane-mirror reference end reflector 8 with regard to the beam exit in relation to lateral displacements thereof.

However, the influence of a tilting of the assembly "three-plane-mirror reference end reflector 8", represented here by rotation about a vertical axis, on an incident beam or a wavefront is comparable with the tilting of a plane mirror. Therefore, the three-plane-mirror reference end reflector 8 as an intrinsically rigid assembly also has to be aligned angularly in order that the chief ray of the beam can be incident at least approximately perpendicularly on the virtual mirror plane VSE, in order here to keep small the lateral offset of the interfering wavefronts in the detection plane of the interference. A tilting of the assembly "three-plane-mirror reference end reflector 8" about a vertical axis can also lead to a reduction of the contrast of the interference in the detection plane. Given a very small focus diameter, however, this influence on the contrast of the interference is very considerably alleviated.

FIG. 4 illustrates a three-plane-mirror reference end reflector 8 having the plane mirrors 9, 10 and 11 in M-form. This arrangement in M-form likewise corresponds to a virtual plane mirror having an additional lateral shear delta_q. A homocentric beam having the incident chief ray EHS and the real focal point BF on the plane mirror 11 is offset in the virtual mirror plane VSE from BFV by the lateral shear having the absolute value delta_q and the virtual focal point BFV' arises. This three-plane-mirror reference end reflector 8 in M-form also has to be oriented angularly like a plane mirror in a traditional Michelson interferometer in order to be able to bring the light to interference.

FIG. 5 illustrates a three-plane-mirror reference end reflector 8 having the plane mirrors 9, 10 and 11 on the basis of an acute triangle ABC of the three trace lines. In this case, linearly polarized light with s-polarization is employed in order to ensure a high reflectance even in the case of grazing light incidence. The beam focus BF arises on the mirror surface 10, as a result of which more stringent requirements are made of the "cleanness" thereof and there has to be a small residual roughness of the mirror surface 10.

Figure 6:
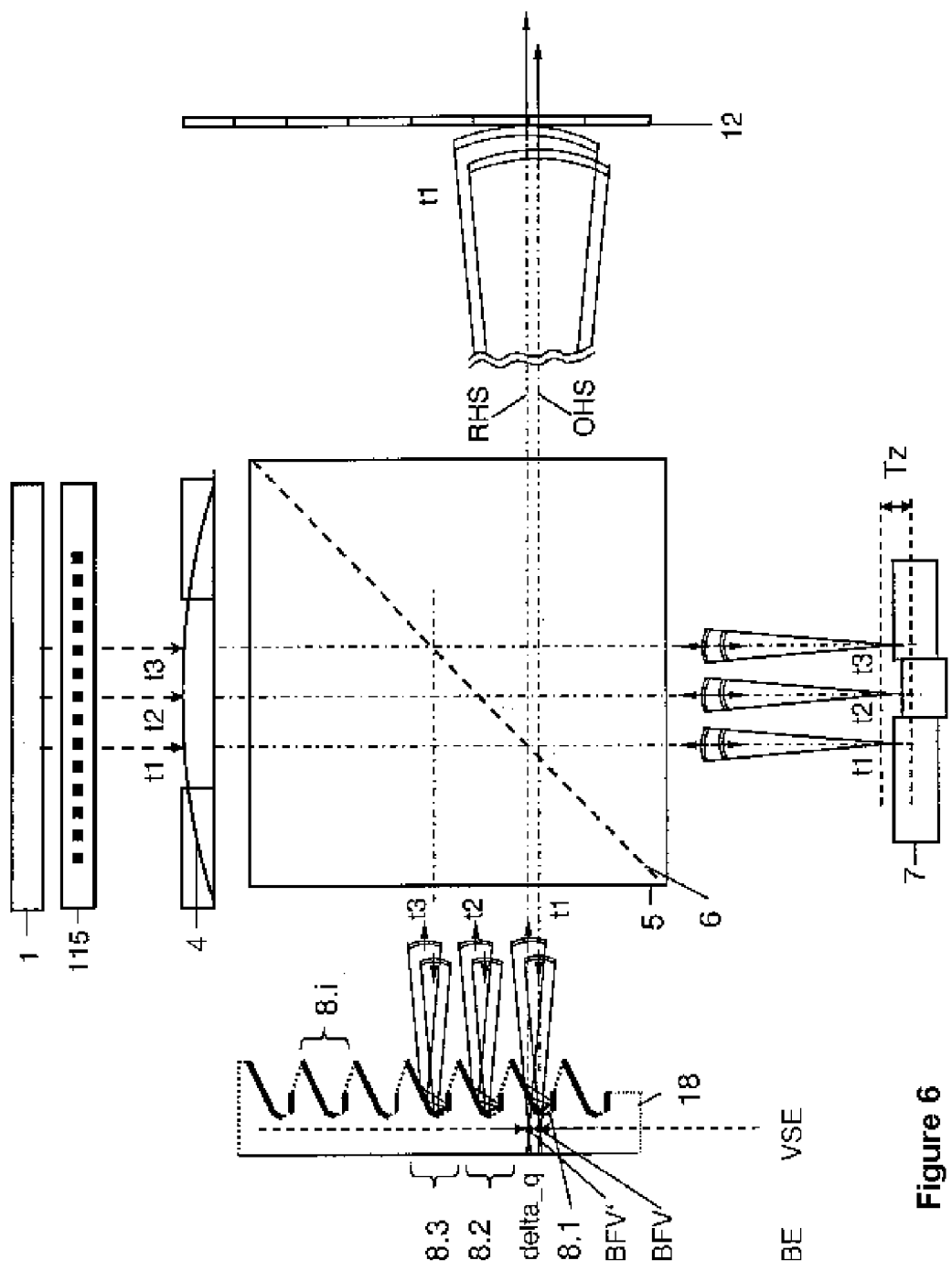
FIG. 6 is a light modulator illuminated by a light source according to the invention.

FIG. 6 shows a light modulator 115 illuminated by a light source 1 (not illustrated in detail here), said light modulator being successively activated by switching, such that at each instant t1, t2, t3 there is a focused beam in a different lateral position. A reference reflector 18 is arranged in the reference beam path, said reference reflector being constructed from a multiplicity of three-plane-mirror reference end reflectors 8.1, 8.2, 8.$i$ ... which are arranged parallel to one another and to which is assigned in each case successively in a telecentric beam path a homocentric beam having a beam focus BFV in the virtual mirror plane. In this case, the optical beam path with the light modulator 115 and the lens 4 having a low numerical aperture of 0.05 is constructed such that the beam foci respectively pass into a three-plane-mirror reference end reflectors 8.$i$ at the instant ti and experience there a lateral shear having the absolute value delta qi, wherein said absolute value delta_q is intended to change as little as possible from position to position on account of precision manufacture of the reference reflector 18. Thus, different object positions can be approached point by point temporally successively on the object 7 and the spatial interferograms that arise can be recorded by means of a large-area line-scan detector 12. In this case, the light source with the light modulator 115 is sequentially laterally activated with through-switching. The physical-optical depth of view range is Tz.

Figure 7:
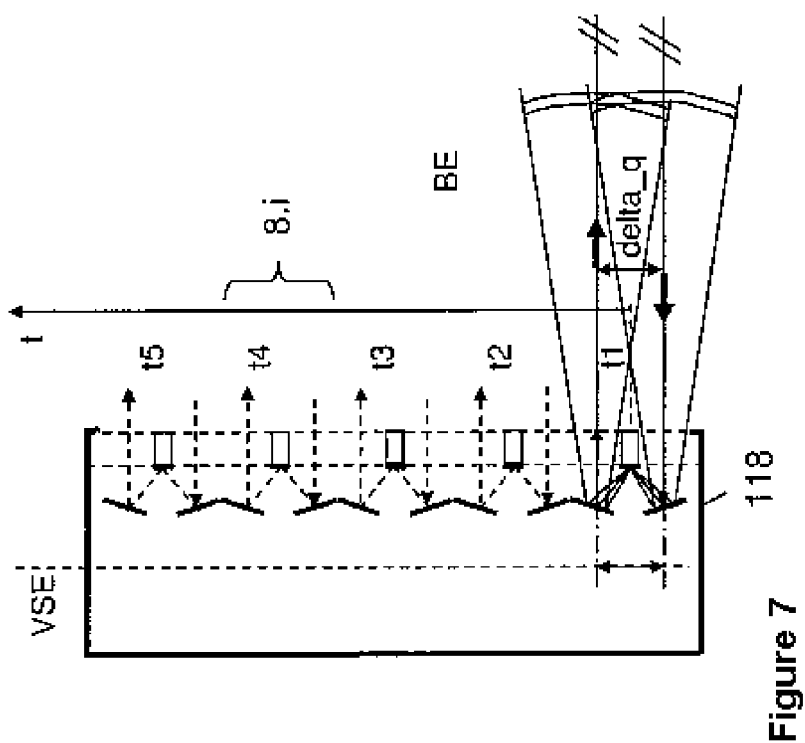
FIG. 7 is a reference reflector made from three-plane-mirror reference end reflectors according to the invention.

FIG. 7 shows a reference reflector 118 made from three-plane-mirror reference end reflectors 8.$i$ in a linear structure on the basis of an arrangement of plane mirrors in M-form. Here, too, the illumination takes place time-sequentially.

Figure 8:
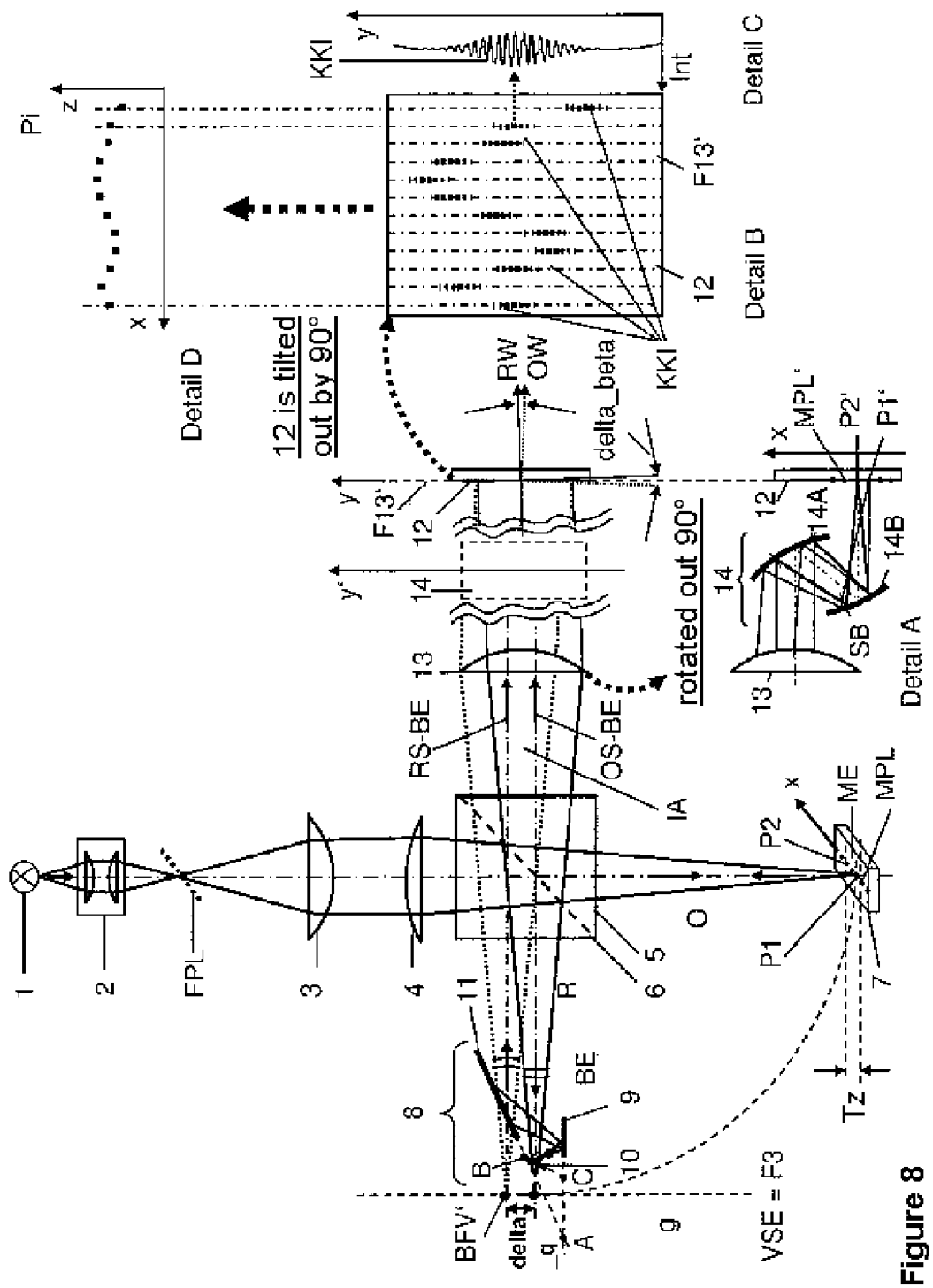
FIG. 8 is a sensor on the basis of a Michelson interferometer for a relatively large object field according to the invention.

FIG. 8 shows a sensor on the basis of a Michelson interferometer for a relatively large object field, that is to say at the upper end of the microscopic scale. The light from a spectrally comparatively broadband light source 1 in the near infrared range is brought to a focal point line FPL by means of a beam shaping optical system 2, wherein a slit can also be arranged here. The light of the focal point line FPL is collimated by a lens 3 and is focused again by a focusing lens 4 having a numerical aperture of 0.05 and subsequently passes into a Michelson-type interferometer comprising a beam splitter 5 and a beam splitter surface 6, where the light is split into a reference beam R and an object beam O. The object light beam O passing rectilinearly through the beam splitter 5 impinges on the object surface of the object 7 in a focused manner, said surface being situated here almost in the measurement plane ME and forms a measurement point line MPL. The object surface is intended to be situated within the physical-optical depth of view range of the focused light Tz. The light returning from the object 7 is directed in the direction of the line-scan detector 12 at the beam splitter surface 6 by reflection via the interferometer output IA. The object chief ray OS-BE in the plane BE is illustrated.

The light reflected into the reference beam path R at the beam splitter 5 after entrance into the interferometer passes to a three-plane-mirror reference end reflector 8 consisting of the three plane mirrors 9, 10 and 11.

At the three-plane-mirror reference end reflector 8, each focal point of the incident reference light experiences a lateral shear of the absolute value delta_q. The location where the lateral shear arises is the virtual mirror plane VSE.

In this case, relative to the interferometer output IA, the virtual mirror plane VSE represents an optically conjugate plane with respect to the measurement plane ME of the object beam path, which is provided by the alignment of the interferometer. The reference light reflected at the three-plane-mirror reference end reflector 8, represented by the reference chief ray RS-BE, leaves the interferometer after rectilinearly passing through the beam splitter 5 with the beam splitter surface 6 via the interferometer output IA.

A cylindrical lens 14 having the cylinder axis y' is disposed downstream of the lens 13 having a comparatively long focal length, with a focal length of 120 mm. The line-scan detector 12 is situated in the focal plane F13' of the lens 13, which also represents the Fourier plane of said lens 13. Solely the refractive power of the lens 13 is taken into consideration here for determining the position of the Fourier plane. In this case, the measurement plane ME is situated at least approximately in the focal plane F13 of the lens 13. Downstream of the lens 13, a reference wave RW and an object wave OW respectively form the angle delta_beta, which results as the quotient of the absolute value delta_q of the lateral shear and the focal length F13' in radian measure. The angle delta_beta should be regarded as constant here owing to the invariance of the absolute value delta_q of the lateral shear, and thus so is the interference fringe width dS, which for the centroid wavelength lamba_cent results at least approximately from $$dS=(\text{Lambda\_cent}*f')/\text{delta\_}q \qquad (3)$$

Detail A illustrates the cylindrical mirror assembly 14, which consists of the cylindrical mirrors 14$a$ and 14$b$, and which images the measurement points P1 and P2 in the measurement plane ME by beams of rays into the measurement point images P1' and P2' on the line-scan detector 12 in interaction with the lens 13. By virtue of the resulting refractive power of the lens 13 and of the cylindrical optical system 14, the measurement plane ME and the plane of the line-scan detector 12, by virtue of beams of rays which are focused by the cylindrical mirror assembly 14, are optically conjugate.

Detail B illustrates the plane of the line-scan detector 12 with the spatial short-coherence interferograms KKI of the individual measurement points of the measurement point line MPL.

Detail C shows the spatial interferogram of a measurement point PI and detail D illustrates a profile z(x) of the object 7 along the measurement point line MPL, said profile being calculated point by point from the spatial short-coherence interferograms.

Figure 9:
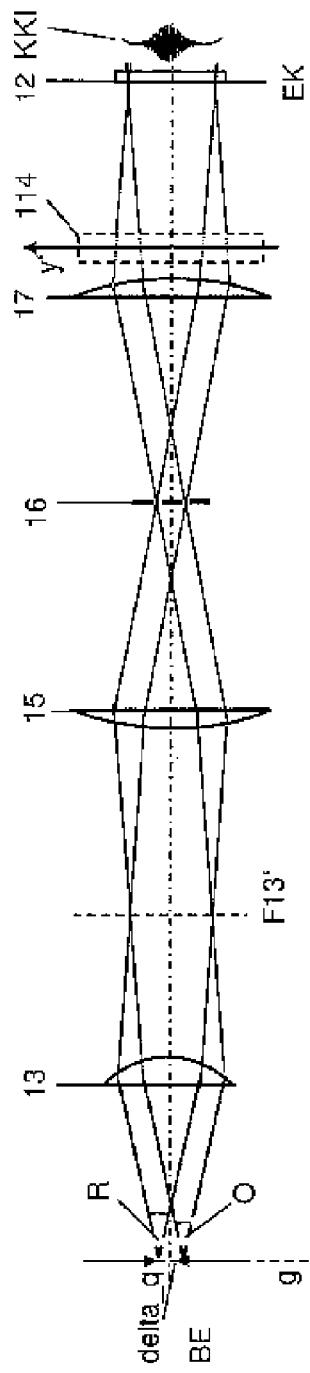
FIG. 9 is a beam path developed with regard to an interferometer and having a lateral and a cylindrical optical system disposed downstream according to the invention.

FIG. 9 shows a beam path developed with regard to the interferometer and having the lateral shear of the absolute value delta_q and a cylindrical optical system 114 disposed downstream. The latter serves to form a stack of spatial short-coherence interferograms on the line-scan detector 12. In this case, the plane of the line-scan detector 12 is optically conjugate with respect to the focal plane F13' of the lens 13 through the rotationally symmetrical lenses 15 and 17. At the same time, there is an optical conjugation with respect to the plane of the double slit 16 and with respect to the measurement plane ME by the imaging of beams of rays through the cylindrical optical system 114. In this case, the cylindrical optical system 114 is corrected well chromatically and with regard to distortion. The axis y' of the cylindrical optical system 114 is parallel to the plane BE and also parallel to the straight line g at the intersection of the reference plane BE and the virtual mirror plane VSE.

Figure 10:
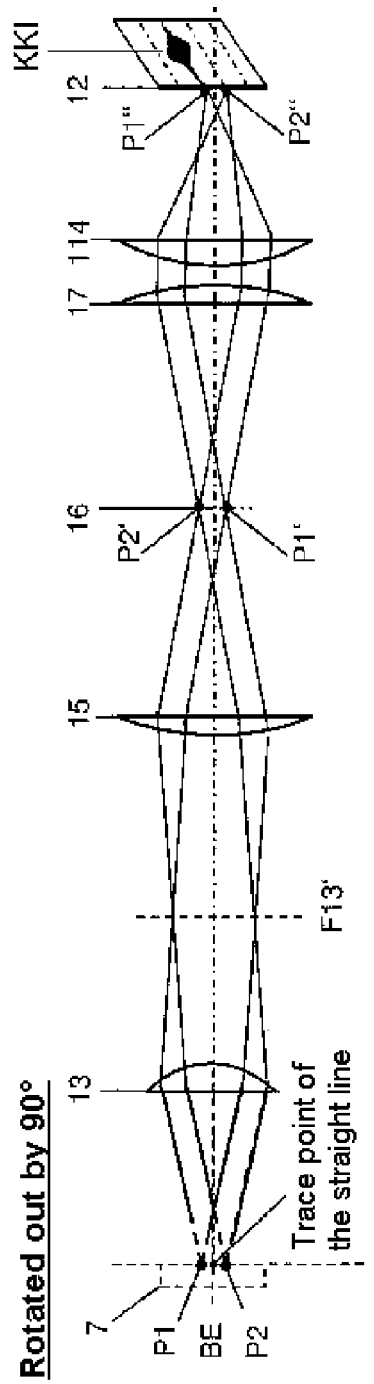
FIG. 10 is a side view of the beam path of FIG. 9.

FIG. 10 illustrates a view rotated by 90°. The optical conjugation of the object points P1, P2 from the object 7 and also P1', P2' and P1", P2" in the detector plane can be discerned.

Figure 11:
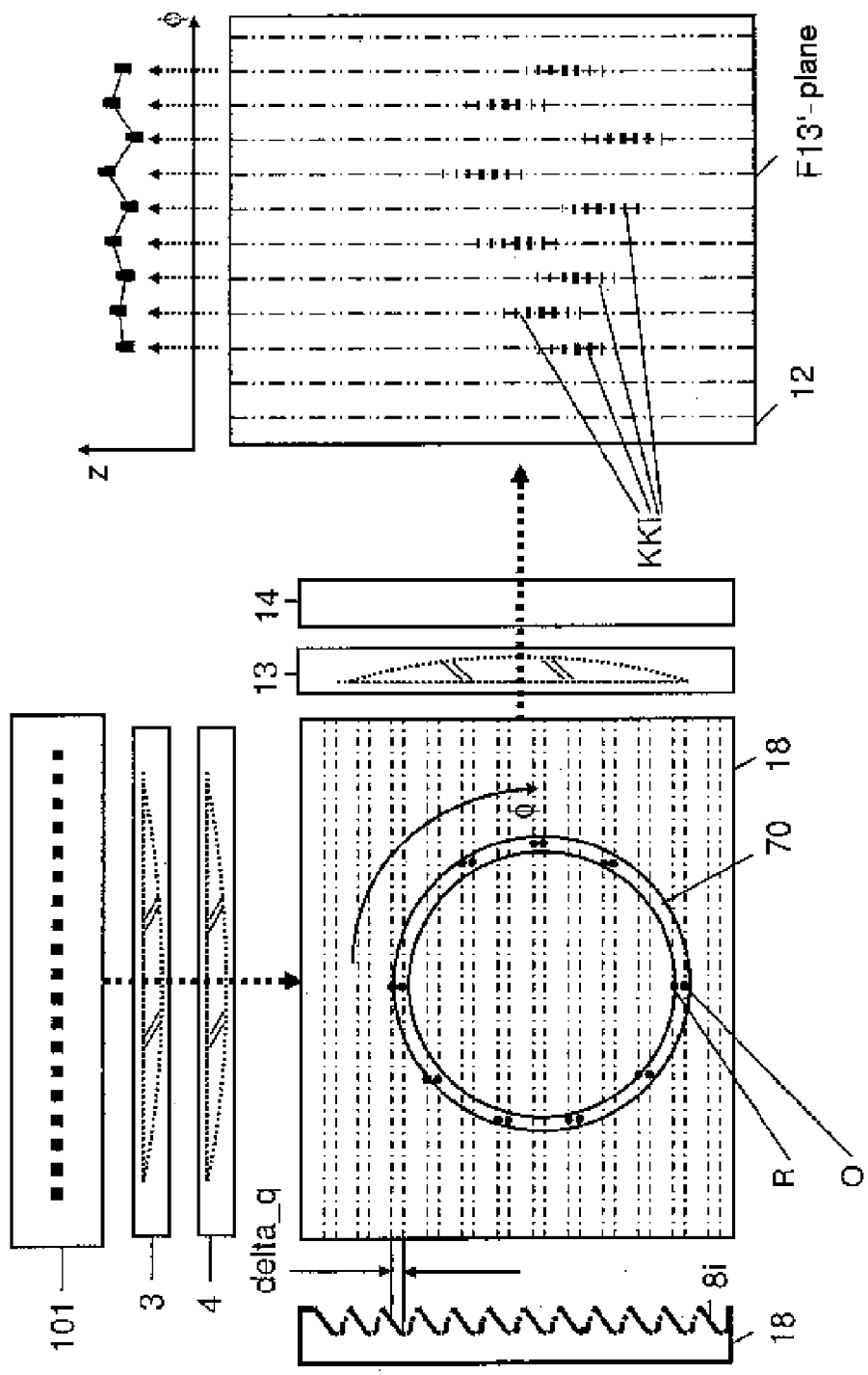
FIG. 11 shows an arrangement in which different measurement points can be spatially addressed in an object field according to the invention.

FIG. 11 shows an arrangement in which different measurement points can be spatially addressed in an object field. The light from a source of short-coherent radiation 111 with beam shaping optical system and spatial light modulator passes through the lenses 3 and 4 and enters into the Michelson interferometer. The illustration shows here an array 18 of linear three-plane-mirror reference end reflectors 8.i, which is arranged in the reference beam path. The object 70, here a sealing disk for testing flatness, is simultaneously illuminated with a number of light points for measuring flatness, wherein here each measurement point is associated respectively with a reference light point R and an object light point O, which form a pair of coherent light points from which a spatial interferogram is respectively generated. After imaging in accordance with the beam path according to FIG. 8, there arises in the plane of the detector 12, the Fourier plane F13', a stack of spatial short-coherence interferograms KKI, which can be used to calculate the flatness deviation over the angle φ. A prerequisite is calibration of the measurement system, for example with a plane mirror in the object position.

Figure 12:
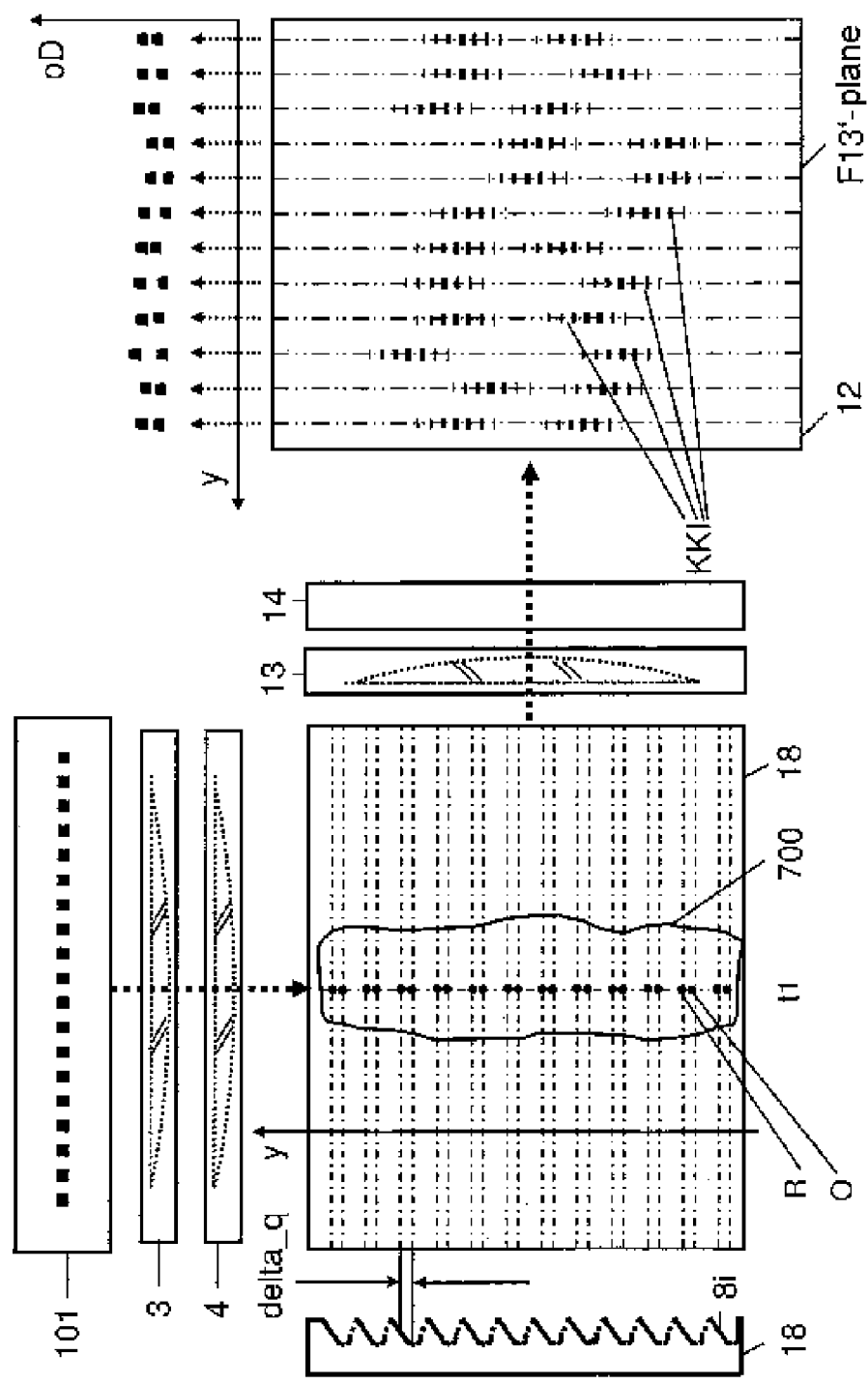
FIG. 12 shows a biological layered object according to the invention.

FIG. 12 shows a biological layered object 700. The layered object 700 is illuminated simultaneously with a number of light points at the instant t1. Reflections arise at each layer, and lead to short-coherent spatial interferograms. After imaging in accordance with the beam path according to FIGS. 9 and 10, there arises in the plane of the detector 12, the Fourier plane F13', a stack of pairs of spatial short-coherence interferograms KKI, which can be used to determine the optical thickness oD of the biological layered object 700 over a lateral coordinate.

Figure 13:
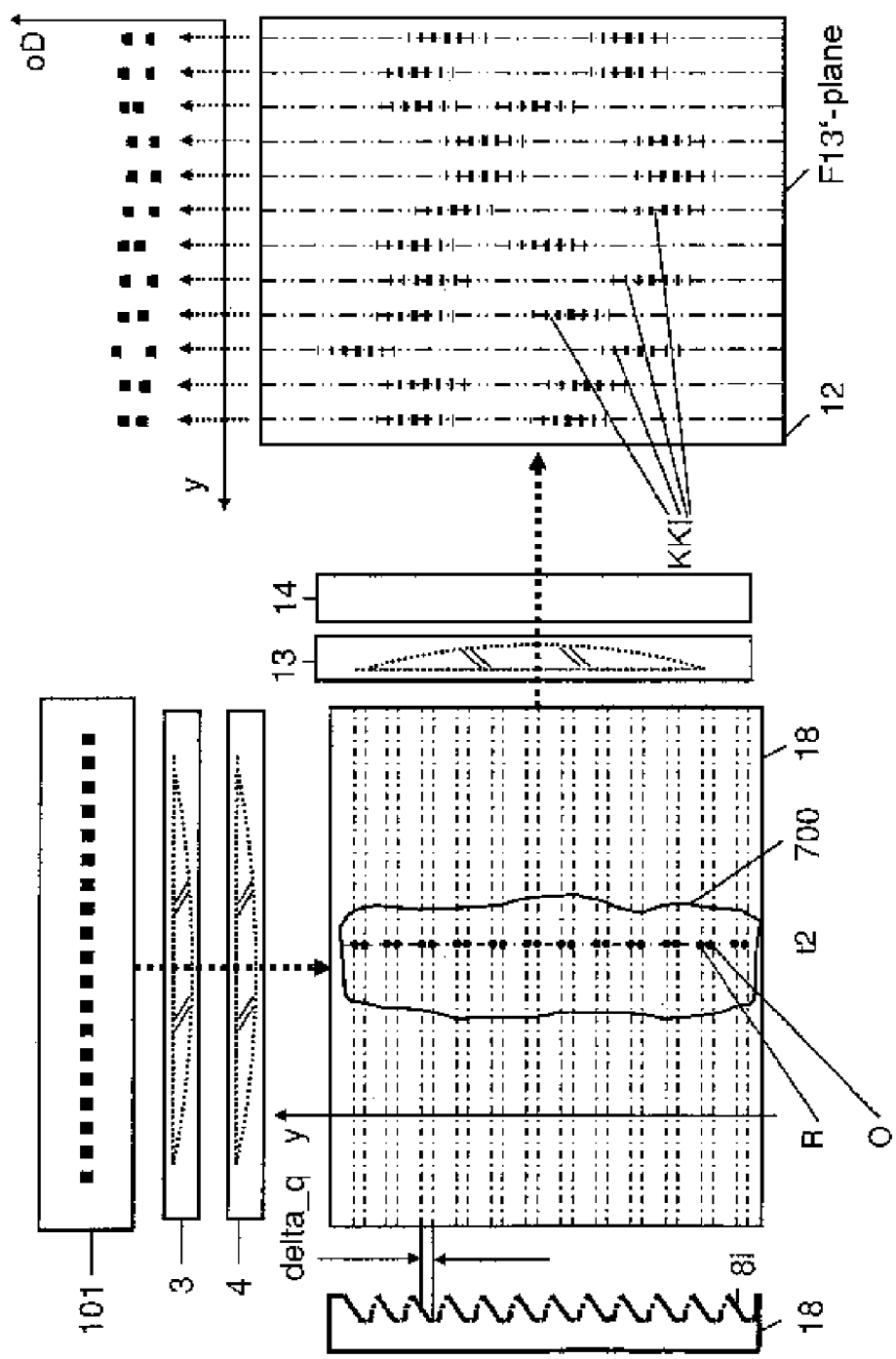
FIG. 13 shows another view of the biological layered object of FIG. 12.

In FIG. 13, a different region of the biological layered object 700, that is to say a region displaced laterally somewhat along a line, is addressed by the source of short-coherent radiation 101 by means of the control of the spatial light modulator at the instant t2. It is thus possible to determine the profile of the optical thickness oD of the biological layered object 700 in a spatially resolved manner, here along the coordinate y. Here, too, a calibration of the measurement system is a prerequisite.

Figure 14:
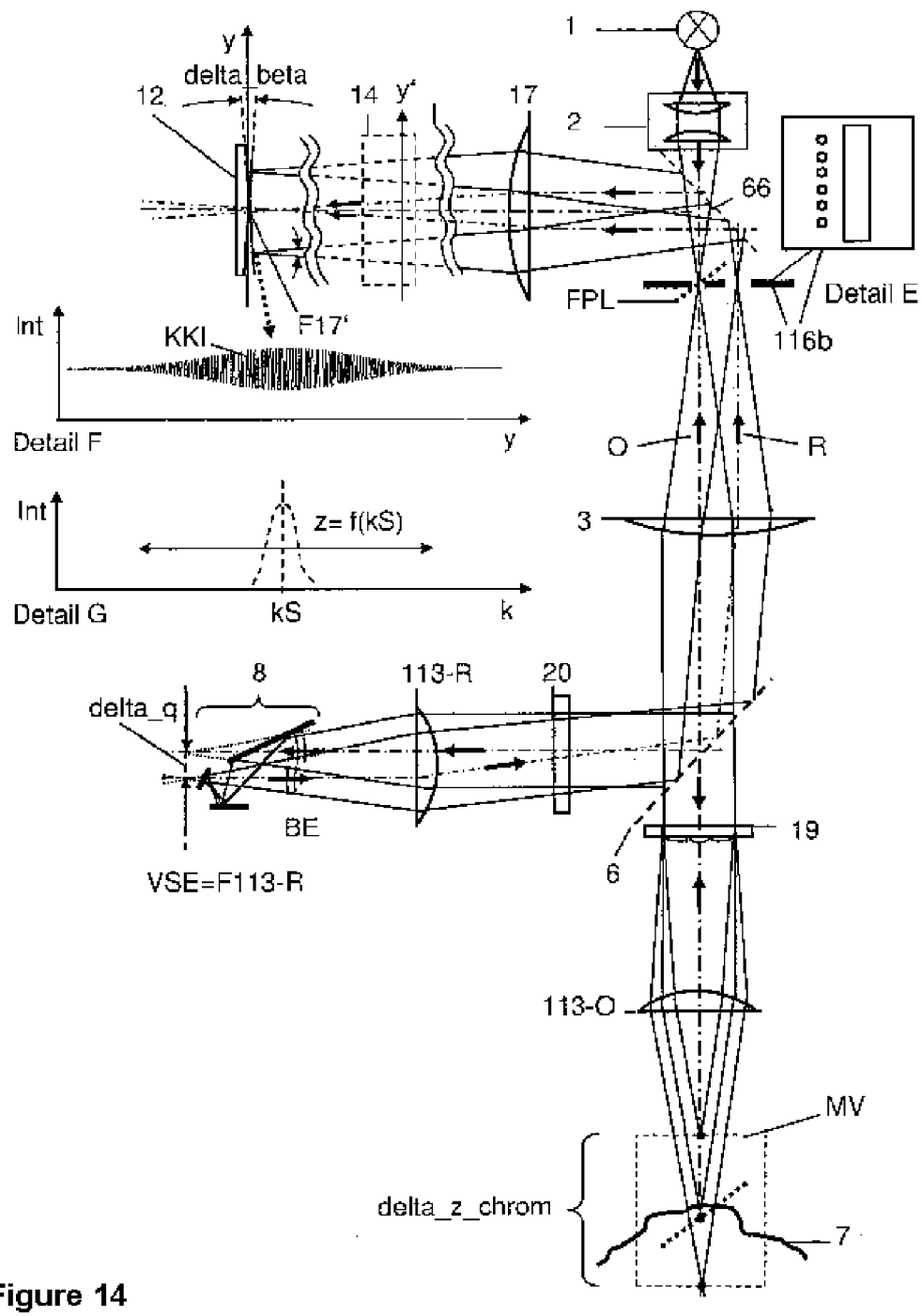
FIG. 14 illustrates a Linnik-type interferometer for application as a multi-point sensor according to the invention.

FIG. 14 illustrates a Linnik-type interferometer for application as a multi-point sensor. The light from a spectrally comparatively broadband light source 1 in the near infrared range is brought to a focal point line FPL after passing through a beam splitter 6—for later coupling-out of the light—by means of a beam shaping optical system 2. An asymmetrical confocal multi double diaphragm 116b is situated in the plane of the focal point line FPL, said diaphragm being illustrated in detail E. The light of the foci of the focal point line FPL passes through the pinholes in the left-hand region of the diaphragm 116b. The lens 3 collimates the beams from the individual pinholes, which subsequently enter into the Linnik-type interferometer having a numerical aperture of 0.25 of the lenses 113-R and 113-O. In this case, the low-loss beam splitter layer 6 of this interferometer is highly transmissive, here the transmittance is 85%, and thus even weakly reflective objects can be measured well.

In the object beam path of this Linnik-type interferometer, use is made here of a refractive-power-compensated lens system 19 with a diffractive optical element for the chromatic depth splitting of foci for increasing the depth measurement range. The lens system 19 has the refractive power zero for the centroid wavelength in the spectrum used, that is to say that the lens system 19 for the centroid wavelength behaves like a plane-parallel plate with regard to the refractive power. For wavelengths above and below the centroid wavelength, divergent and respectively convergent beams of rays thus arise if a beam having the focal point at infinity exists for the centroid wavelength. By means of the chromatic depth splitting, the intention here is to increase the depth measurement range of the system approximately by a factor of 5 relative to the physical-optical depth of view resulting from the numerical aperture and the spectrum used. A compensation element 20 for matching the optical path difference is arranged in the reference beam path.

The spatial interferograms are evaluated here by means of a centroid evaluation of the spatial interferogram KKI which is considerably widened by the chromatic-confocal discrimination but which still constitutes a short-coherence interferogram. The light returning from the object 7 is confocally discriminated at the asymmetrical confocal multi double diaphragm 116b by the pinholes in the left-hand region. The light returning from the interferometer after reflection at the three-plane-mirror reference end reflector 8 passes through the right-hand region of the confocal multi double diaphragm 116b, said region being comparatively large with respect to the pinholes. Object light and reference light are coupled out after passing through the confocal multi double diaphragm 116b by means of beam splitter 66 into the detection beam path. By means of the imaging stage, consisting of the rotationally symmetrical lens 17 and the cylindrical optical system 14, a stack of spatial interferograms are generated, from which the centroid of the envelopes is evaluated. Detail F shows an individual spatial interferogram KKI, from which the centroid of the envelope is evaluated. In this case, however, the spatial frequency in the spatial short-coherence interferogram KKI is also dependent on the depth position of the object 7 since the centroid length changes as a result of the confocal masking-out of spectral components. This has to be taken into consideration in the evaluation.

Therefore, here, that is to say in the case of chromatic depth splitting of foci in the object beam path, as an alternative to the centroid evaluation of the envelope of the spatial short-coherence interferogram KKI, it is appropriate to carry out a Fourier transformation of the intensity distribution of the spatial interferogram in order to determine from the spatial short-coherence interferogram KKI, also see detail F, the spectrum of the confocally discriminated, that is to say of the transmitted, light. This is illustrated in detail G. The centroid wavenumber kS, where kS=2Pi/centroid wavelength, of said spectrum is directly dependent on the depth z of a measured object point at each measurement point—on account of the chromatic depth splitting in the object beam path. This corresponds to the chromatic-confocal approach, which is applied here by way of the determination of the centroid wavenumber kS by means of a fast Fourier transformation of the intensity distribution of spatial interferograms. The numerical relationship between the centroid wavenumber kS and the depth z of a measured object point can be stored as the result of a sensor calibration in a table and can be made available by means of a computer in the measurement operation.

Figure 15:
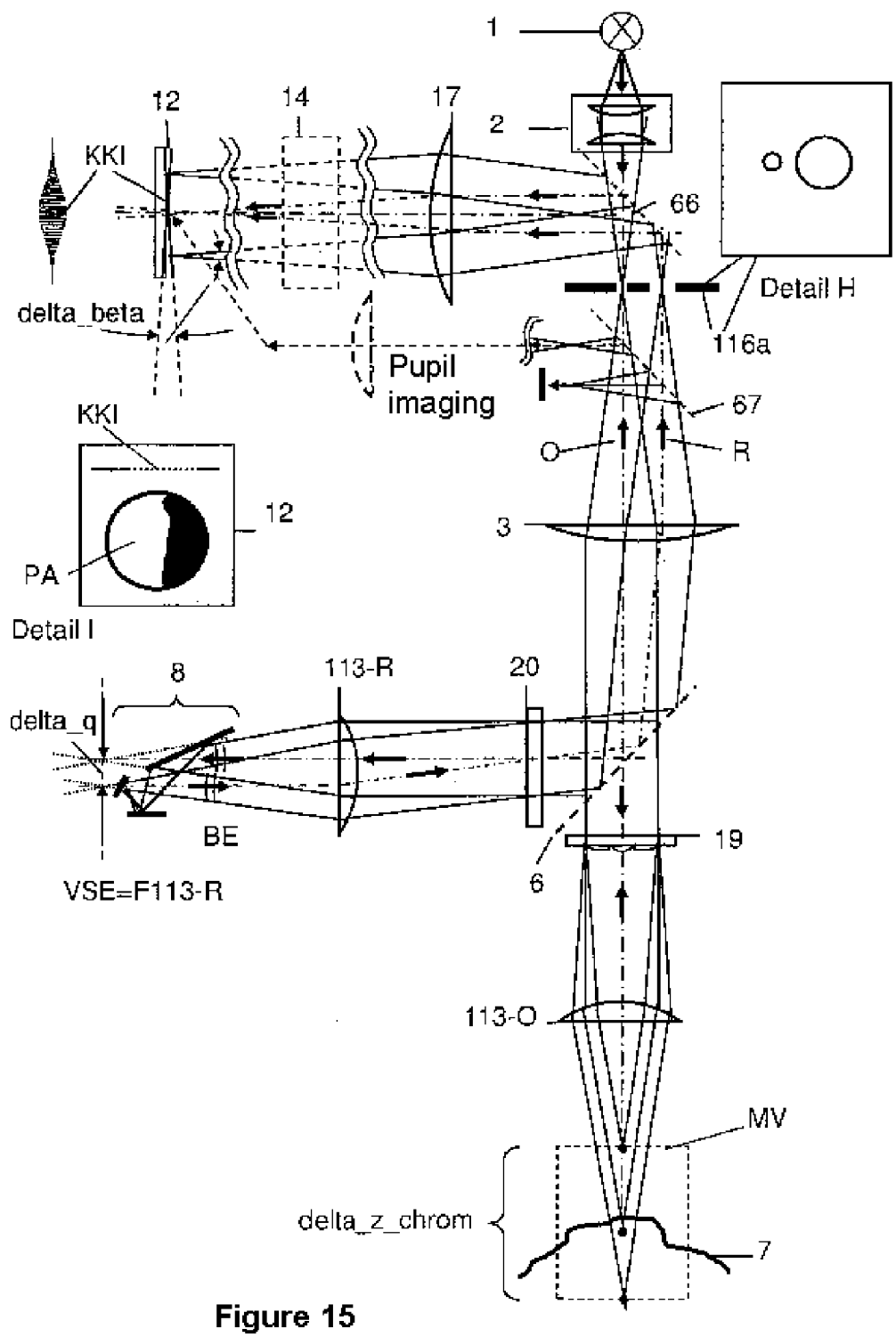
FIG. 15 illustrates the Linnik-type interferometer for application as a point sensor of FIG. 14 in which Detail H shows a confocal double diaphragm having two openings and Detail I illustrates the spatial interferogram and the pupil illumination on a line-scan detector for a measurement point.

FIG. 15 illustrates a Linnik-type interferometer for application as a point sensor. Detail H shows the confocal double diaphragm 116a having only two openings that is used here. The beam course corresponds to that described in FIG. 14 and in detail E. However, the pupil illumination PA is also detected here. That is made possible by a beam splitter 67.

Detail I in FIG. 15 illustrates the spatial interferogram and the pupil illumination on the line-scan detector 12 for a measurement point. In the case of a point sensor, a pupil observation with a blocked reference beam path on the same line-scan detector 12 can take place here. That is possible in real time. The upper region of the detector 12 detects a spatial short-coherence interferogram (KKI), and the lower region detects the pupil illumination PA. The latter includes essential information about the characteristic of the measured object point. However, the pupil imaging is effected here without an imaging via the cylindrical optical system 14 with suitable optical means onto the detector 12.

Figure 16:
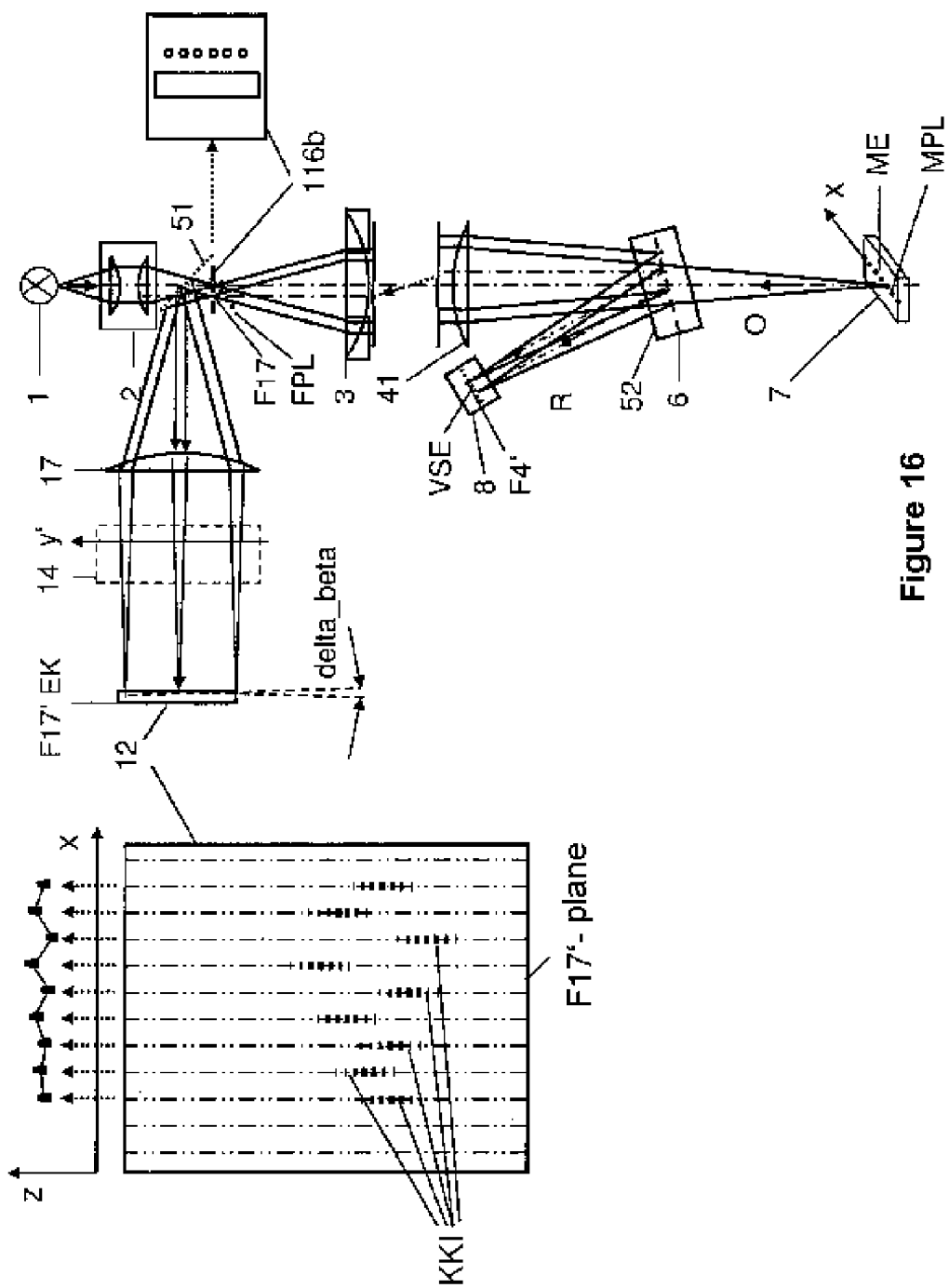
FIG. 16 shows an arrangement on the basis of a Michelson-type interferometer for multi-point scanning along a line according to the invention.

FIG. 16 shows an arrangement on the basis of a Michelson-type interferometer for multi-point scanning along a line. In addition, the system has a large angle between object arm and reference arm in order to make possible a comparatively slim sensor design.

The light from a spectrally comparatively broadband light source 1 in the near infrared range is brought to a focal point line FPL by means of a beam shaping optical system 2 and passes through the diaphragm arrangement 116b through the pinholes. This was also preceded by passage through a beam splitter 51, which serves for later coupling-out. The light of the focal point line FPL is collimated by a lens 3 downstream of the diaphragm arrangement 116b and is focused again by a focusing lens 4 having a numerical aperture of 0.05 and subsequently passes into the Michelson-type interferometer having a comparatively weakly tilted double-plate beam splitter 51 and a beam splitter surface 6 where the incident light is split into a reference beam R and an object beam O. The light returning from the object 7 and from the three-plane-mirror reference end reflector 8 passes via the double-plate beam splitter 52 once again in the direction of diaphragm arrangement 116b. Here the object light is confocallly discriminated by the pinholes in the right-hand part of the diaphragm arrangement 116b. The reference light passes through the comparatively large opening in the left-hand part of the diaphragm arrangement 116b without confocal discrimination. At the beam splitter 51, the coupling-out takes place in the direction of detection via the lens 17 and the cylindrical optical system 14, which leads to the formation of linear short-coherence interferograms KKI in the Fourier plane of the lens 17, which are recorded by means of the line-scan detector 12, from which it is possible to calculate the profile over the coordinate x.

Figure 17:
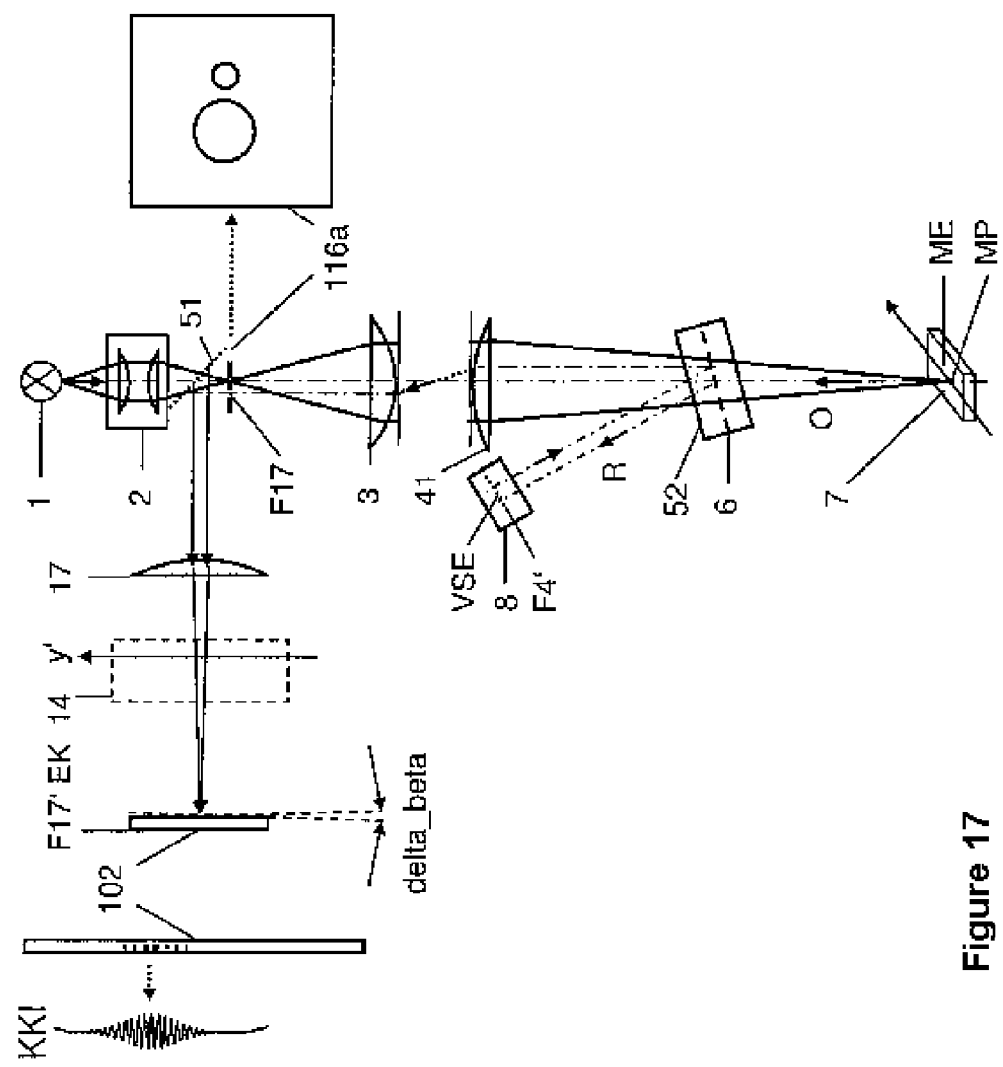
FIG. 17 illustrates an arrangement on the basis of a Michelson-type interferometer for one-point scanning according to the invention.

FIG. 17 illustrates an arrangement on the basis of a Michelson-type interferometer for one-point scanning. The light from a spectrally comparatively broadband light source 1 in the near infrared range is brought to a focal point by means of a beam shaping optical system 2 and passes through the diaphragm arrangement 116a through the pinhole. This was also preceded by passage through a beam splitter 51, which serves for later coupling-out. The light of the focal point is collimated by a lens 3 downstream of the diaphragm arrangement 116a, which has one pinhole and a comparatively large opening, and is focused again by a focusing lens 4 having a numerical aperture of 0.08 and subsequently passes into the Michelson-type interferometer having a comparatively weakly tilted double-plate beam splitter 51 and a beam splitter surface 6 where the incident light is split into a reference beam R and an object beam O. The light returning from the object 7 and from the three-plane-mirror reference end reflector 8 passes via the double-plate beam splitter 52 once again in the direction of diaphragm arrangement 116a. Here the object light is confocallly discriminated by the pinhole in the right-hand part of the diaphragm arrangement 116b. The reference light passes through the comparatively large opening in the left-hand part of the diaphragm arrangement 116a without confocal discrimination. At the beam splitter 51, the coupling-out takes place in the direction of detection via the lens 17 and the cylindrical optical system 14, which leads to the formation of an individual, linear short-coherence interferogram KKI in the Fourier plane F17' of the lens 17, which is recorded by means of the line-scan line detector 102, from which it is possible to calculate a measurement point MP on the object 7, which measurement point contains distance information.

Figure 18:
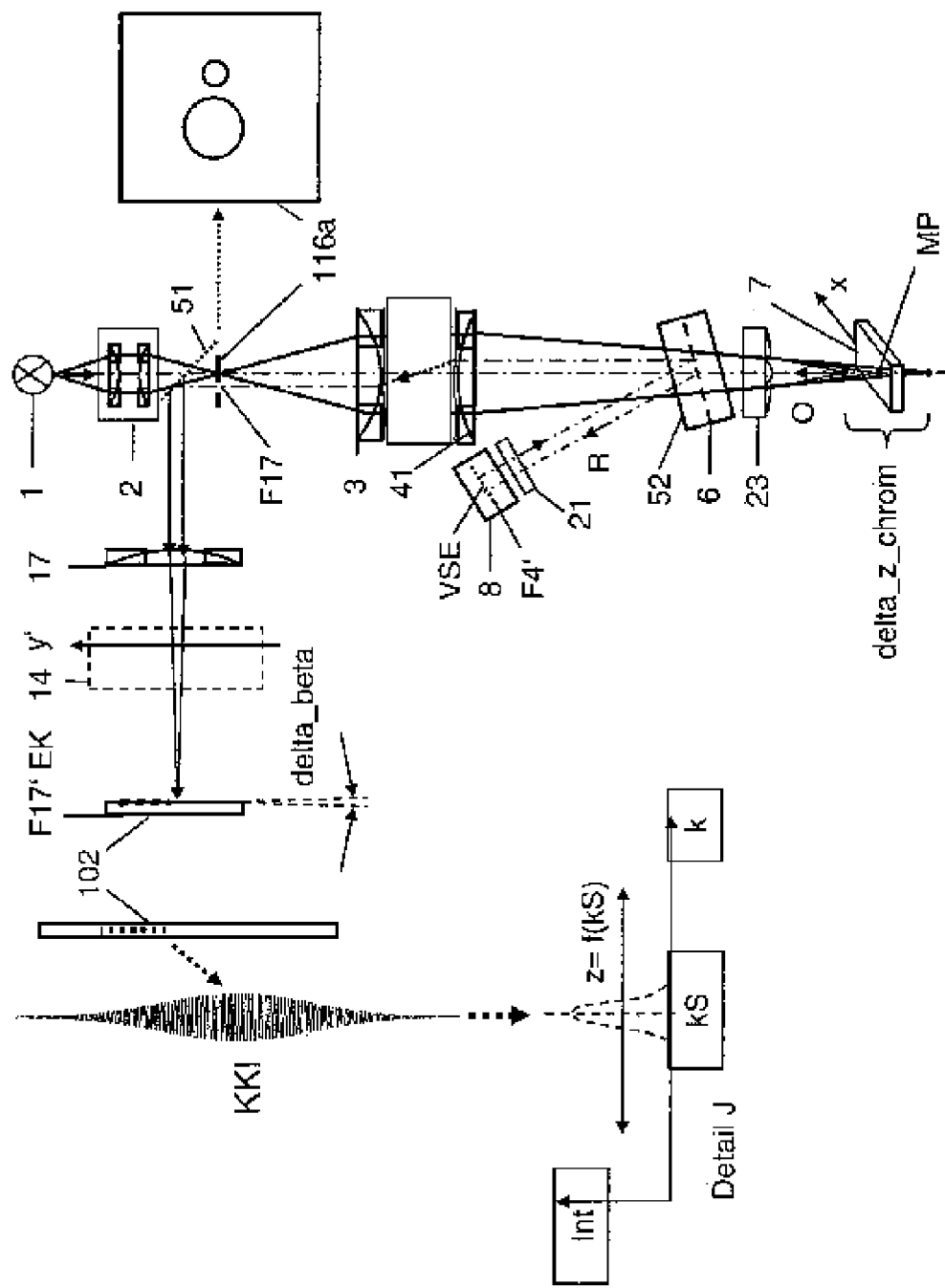
FIG. 18 illustrates an arrangement on the basis of a Michelson-type interferometer for one-point scanning according to the invention.

FIG. 18 illustrates an arrangement on the basis of a Michelson-type interferometer for one-point scanning. The light from a spectrally comparatively broadband light source 1 in the near infrared range is brought to a focal point by means of a beam shaping optical system 2 and passes through the diaphragm arrangement 116a through the pinhole. This was also preceded by passage through a beam splitter 51, which serves for later coupling-out. The light of the focal point is collimated by a lens downstream of the diaphragm arrangement 116a, which has one pinhole and a comparatively large opening, and is focused again by a focusing lens 4 having a comparatively long focal length and having a numerical aperture of 0.1 and subsequently passes into the Michelson-type interferometer having a comparatively weakly tilted double-plate beam splitter 52 and a beam splitter surface 6 where the incident light is split into a reference beam R and an object beam O. A diffractive optical phase element 23 in the form of a Fresnel lens having positive refractive power is arranged in the object beam path. Depth splitting of foci in the depth range delta z chrome takes place in the object space, as a result of which the depth measurement range is increased approximately to 400 µm. The light returning from the object 7 and from the three-plane-mirror reference end reflector 8 passes via the double-plate beam splitter 52 once again in the direction of diaphragm arrangement 116a. Here the object light is confocallly discriminated by the pinhole in the right-hand part of the diaphragm arrangement 116b, wherein only the spectral components of the light which were previously imaged sharply on the object 7 can pass through the pinhole. The reference light passes through the comparatively large opening in the left-hand part of the diaphragm arrangement 116a without confocal discrimination. At the beam splitter 51, the coupling-out takes place in the direction of detection via the lens 17 and the cylindrical optical system 14, which leads to the formation of an individual, linear short-coherence interferogram KKI in the Fourier plane F17' of the lens 17, which is recorded by means of the line-scan line detector 102, from which it is possible to calculate a measurement point MP on the object 7, which measurement point contains distance information. For this purpose, the comparatively wide linear short-coherence interferogram KKI is subjected to a fast Fourier transformation in order to determine the centroid wavenumber kS, see detail J, which is used to obtain the depth information about the measurement point MP. Alternatively, it is also possible to carry out a determination of the centroid of the linear short-coherence interferogram KKI for determining the depth information about the measurement point MP.

FIG. 19 illustrates an arrangement on the basis of a Michelson-type interferometer for one-point scanning, which is based on the illustration in FIG. 17. In addition, a wavelengthstabilized laser diode (not illustrated in detail here) is integrated in the light source assembly 110. In addition, means for spectroscopic splitting, here in the form of a phase grating 22, are situated in the detection beam path, wherein the axis of the spectral splitting lies here in the plane of the drawing and parallel to the y-axis. Lateral splitting thus occurs on the detector. FIG. 20 shows the resulting interference patterns, also known as Müller fringes or as Tolansky fringes. The spatial interferogram KKI-22 represents one of many linear short-coherence interferograms on the line-scan detector 12. The spatial interferogram mon Int originates from the laser diode and serves for extremely accurate phase evaluation, while the spread short-coherence interferograms in the calculation on the basis of a multi-wavelength approach yield the zeroth fringe order and thus the absolute depth or distance information for the measurement point MP on the object 7. In addition, the pupil illumination is also detected in order to obtain the angular spectrum of the measured object point. This gives information about further features of the surface at the measurement point MP.

Figure 21:
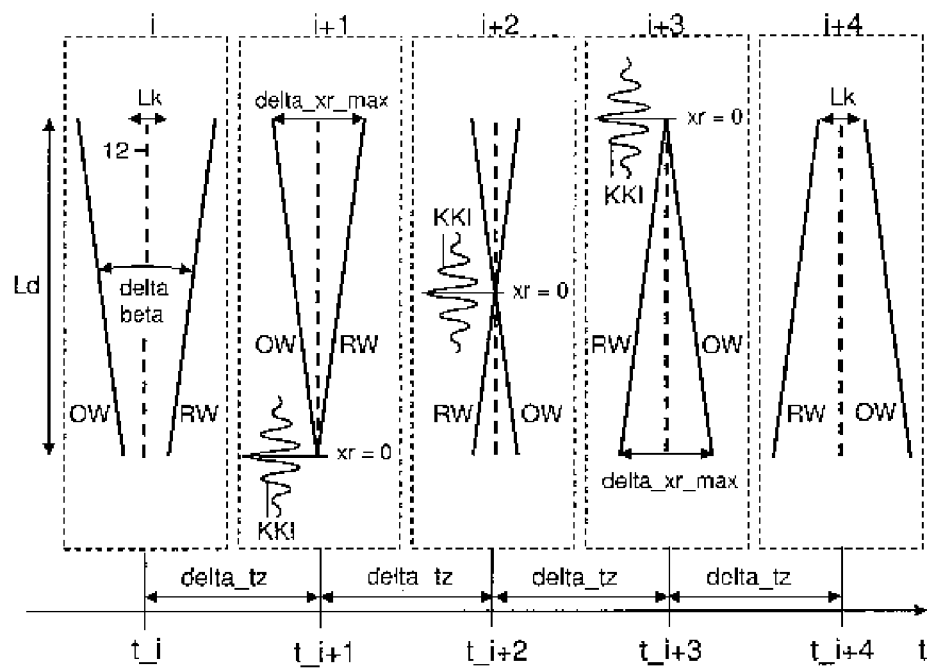
FIG. 21 shows an object wavefront and a reference wavefront which originate from a short-coherence light source after passing through the output of a two-beam interferometer for object detection according to the invention.

FIG. 21 shows in each case an object wavefront OW and a reference wavefront RW at five different instants t i to t i+4, which in each case originate from a short-coherence light source after passing through the output of a two-beam interferometer for object detection. In this case, the coherence length Lk of the radiation is significantly smaller than the spatial change in the optical path difference on the line-scan detector in the spatial interferogram. In FIG. 21, in the interferometer, the optical propagation path of the object wave is progressively illustrated as reduced in size further and further in four steps, which results from five different positions of an optically scanned object in an interferometer (not illustrated here) at the five different instants t i to t i+4. The positions of the wavefronts are in this case depicted over the length Ld of the line-scan detector in each case at the different instants t i to t i+4 in the boxes i to i+4 as a short-time recording and have been illustrated here in a centered manner in each case. In the box i at the instant t i, the wavefronts with the same propagation time—that is to say the object wave and the reference wave—are separated from one another by more than the coherence length Lk, such that no interference can be detected, wherein the optical propagation path of the object wave is greater than that of the reference wave. The direct component of the interferogram is not illustrated here. At the instant t i+1, illustrated in the box i+1, the optical path difference xr=0 at the lower end of the line-scan detector, such that a short-coherence interferogram KKI arises there with its modulation maximum and can be reliably detected. At the upper end of the line-scan detector, the maximum change in the optical path difference delta xr max occurs on the detector, said change here amounting to approximately 20 centroid wavelengths of the detected radiation.

The change in the optical path difference delta xr max over the length Ld of the detector is intended to be at least one centroid wavelength, such that a phase evaluation in the interval +/−180° is readily possible for a measurement point, which is sufficient in many cases for optically smooth objects. In this case, only a small number of pixels of the line-scan detector are used for obtaining the phase information of a measurement point. The number of measurement points detected in a camera image can be all the higher in this case.

In the box i+2 at the instant t i+2, in the central position of the line-scan detector the optical path difference xr=0, such that a short-coherence interferogram KKI can be detected here with its modulation maximum and also with the relevant secondary maxima.

The optical propagation path of the object wave in the interferometer in the box i+3 is smaller than that of the reference wave, and only at the upper end of the line-scan detector is the optical path difference xr=0, such that a short-coherence interferogram KKI can be detected there with its modulation maximum. On account of the even smaller propagation path of the object wave in the interferometer at the instant t i+4 the object wavefront OW and the reference wavefront with the same propagation time in the box i+4 are separated from one another by more than the optical coherence length Lk, such that here as well—as at the instant t i—no interference can be detected.

Figure 22:
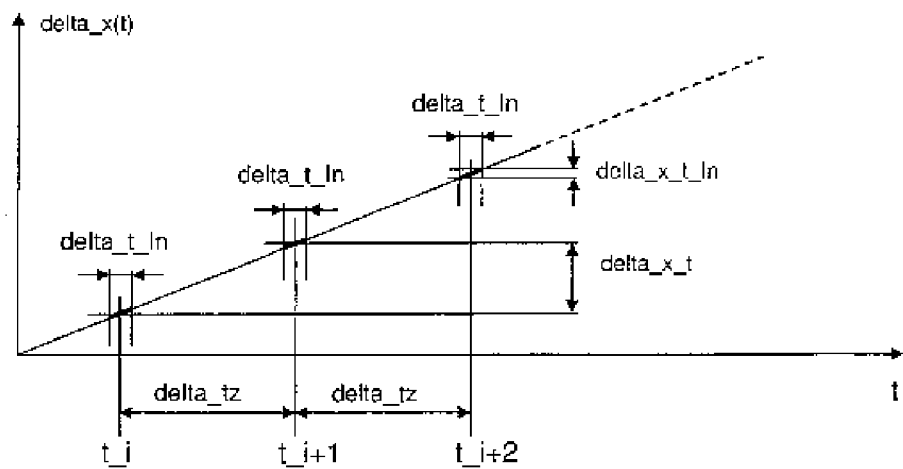
FIG. 22 illustrates the relationship between the temporal change in the optical path difference in the spatial interferogram at a point, and the ratios between adjusting time and integration time of the line-scan detector according to the invention.

FIG. 22 illustrates the relationship between delta x(t), the temporal change in the optical path difference in the spatial interferogram at a point, and the ratios between adjusting time delta tz and integration time of the line-scan detector delta t In. The integration time delta t In is chosen to be significantly shorter than the adjusting time delta tz between two image recordings by means of the line-scan detector.

Figure 23:
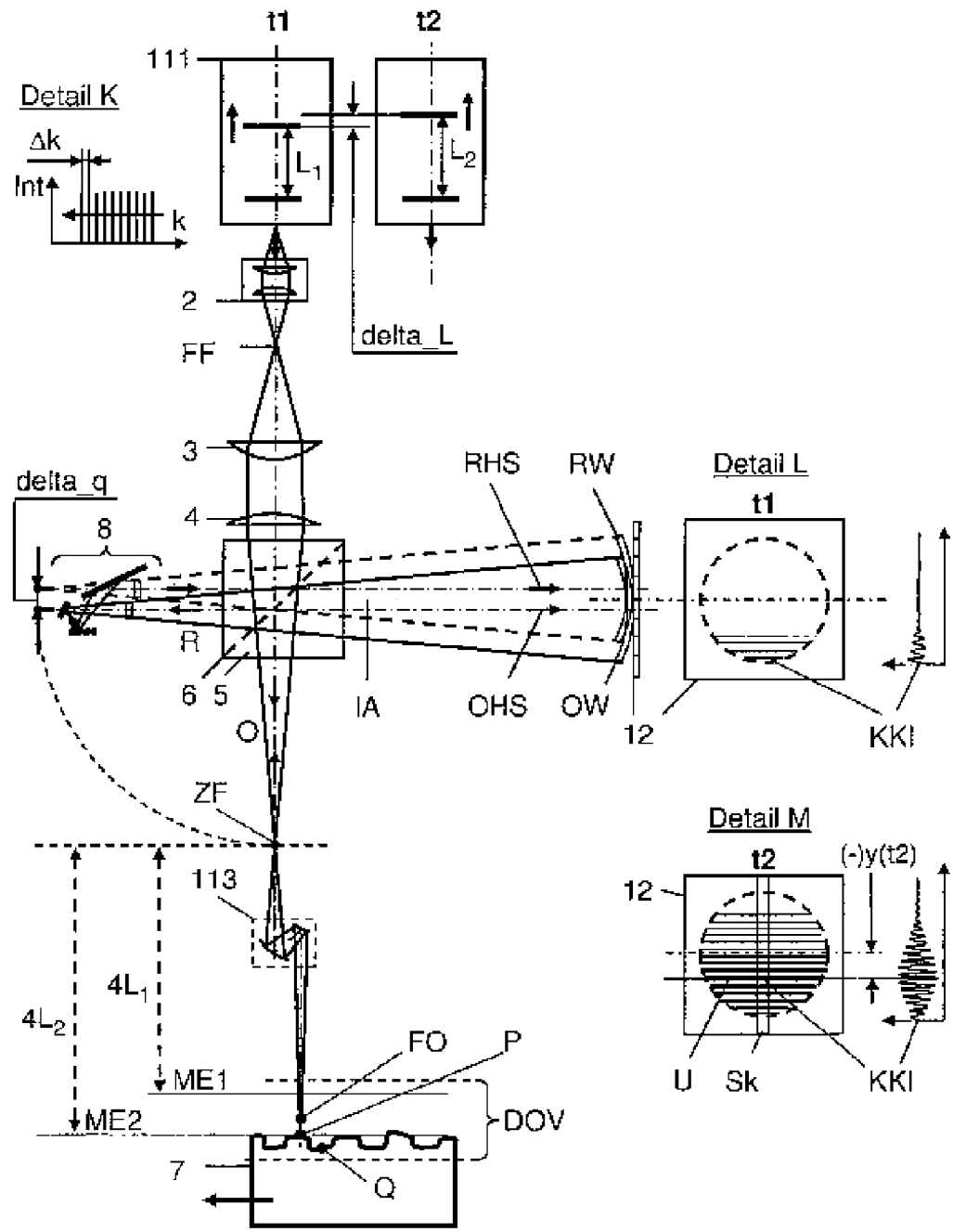
FIG. 23 shows a sensor for the wide-scale distance measurement of an object on the basis of a Michelson interferometer with a macroscopic imaging system according to the invention.

FIG. 23 shows a sensor for the wide-scale distance measurement of an object 7 on the basis of a Michelson interferometer with a macroscopic imaging system.

The frequency comb laser 111 having the single optical length L1 generates at the instant t1 a multi-beam interference spectrum in the near infrared range with a frequency comb characteristic. As illustrated in detail K, the transmitted, narrowband spectral components in this case form a comb having equidistant spacings $\Delta k$ in the wavenumber space, the k-space. The light having a spectral comb characteristic which leaves the light source 111 is brought to a small focal spot FF by means of a beam shaping optical system 2, is subsequently collimated by a lens 3 and is focused again by a comparatively small-aperture focusing lens 4 having a numerical aperture of 0.05. This light subsequently passes into a Michelson-type interferometer having a beam splitter 5 and a beam splitter surface 6 where it is split into a reference beam R and an object beam O.

The light reflected into the reference beam path R at the beam splitter surface 6 after entrance into the interferometer passes to a three-plane-mirror reference end reflector 8.

At the three-plane-mirror reference end reflector 8, the incident reference beam of rays experiences a lateral shear of the absolute value delta q, is reflected there and passes through the beam splitter 5 with the beam splitter surface 6. The returning reference beam of rays, represented by the reference chief ray RHS, leaves the interferometer via the interferometer output IA and passes to the line-scan detector 12.

The object light beam O passing rectilinearly through the beam splitter surface 6 is focused into the intermediate focus ZF. Said intermediate focus ZF is imaged by the mirror lens 113 into the measurement space as focus FO having the physical-optical depth of view range DOV. At the instant t1, the scanned point P of the object surface of the object 7 is situated near the focus FO and within the physical-optical depth of view range DOV of the focused light, which is of the order of magnitude of a few 100 μm on account of the numerical aperture of 0.05. At the instant t1, the optical path length at the object point P is approximately 4L1, that is to say approximately four times the optical path length L1 of the light source 111 having a frequency comb characteristic.

The light returning from the scanned point P of the object surface of the object 7 is directed in the direction of the line-scan detector 12 at the beam splitter surface 6 by reflection via the interferometer output IA. The object chief ray OHS is represented here. The superimposition with the light from the reference beam path occurs on the detector 12. This can give rise to a spatial interferogram on the line-scan detector 12 with an at least approximately constant spatial frequency for the centroid wavelength. The relationships during the interference correspond, given sufficiently good focusing, at least approximately to those in Young's double-slit experiment with two pinholes. An object wavefront OW and a reference wavefront RW are illustrated here on the line-scan detector 12.

The scanned point P of the object surface of the object 7 is situated in the physical-optical depth of view range DOV. However, the optical path difference at the instant t1 between the two superimposing waves, despite compensation by the light source 111 having a frequency comb characteristic, is on average comparatively large, such that only a part of a spatial short-coherence interferogram KKI—that is to say not the maximum of the envelope of the spatial short-coherence interferogram KKI—can be observed on the detector 12, see detail L.

In the time interval delta tz, the optical path length of the light source 111 having a frequency comb characteristic is then increased by delta L, such that there is the single optical path length L2 at the instant t2 in the light source 111 having a frequency comb characteristic. The change delta L in the optical path length of the light source 111 having a frequency comb characteristic, here an increase in the optical path length L2, amounts to approximately ten times the absolute value of the centroid wavelength lambda cent. This change delta L in the optical path length is measured during scanning here with a path resolution of 10 nm, that is to say with high resolution. At the instant t2, four times the optical path length L2 of the light source 111 in the measurement plane ME2 corresponds almost to the depth position of the object point P, such that a spatial short-coherence interferogram KKI can arise in the superimposition region U of the wavefronts, illustrated in detail M. The positional deviation of the measurement plane ME2 from the depth position of the object point P is in the single-digit micrometer range. Detail M shows that the maximum of the envelope of the spatial short-coherence interferogram KKI is in this case displaced from the detector center by (−)y(t2) on the line-scan detector 12. On account of the knowledge of the single optical path length L2 of the light source 111 having a frequency comb characteristic and the a priori knowledge that the measurement plane ME2 is situated at four times the optical path length L2, that is to say at 4L2, and by virtue of the knowledge of the inclination angle of the interfering wavefronts RW and OW from the geometry of the arrangement, the centroid wavelength and by means of the computational determination of the displacement (−)y(t2), the depth position of the object point P can be determined in a computer-aided manner with high accuracy by the well-informed person skilled in the art using algorithms known in the prior art. This is carried out here, inter alia, by means of an envelope evaluation of the short-coherence interferogram KKI, which is detected here for example along the slits Sk of the detector 12. The possibility of the comparatively coarse change delta L in the optical path length of the light source 111 having a frequency comb characteristic in this case results in significantly faster depth scanning of an object point P in comparison with traditional white light interferometry, where a scan step during the scanning of a short-coherence interferogram is typically only one eighth of the centroid wavelength.

For the case where even after the first change delta L in the optical path length, the maximum of the envelope of the short-coherence interferogram KKI is not situated on the line-scan detector 12, a further change delta L in the optical path length in the light source 111 having a frequency comb characteristic is carried out in the time interval delta tz. This can be repeated until the maximum of the envelope of the short-coherence interferogram KKI arises on the detector, in particular the line-scan detector 12. In this case, however, the current measurement plane ME must always be situated in the physical-optical depth of view range. Otherwise, refocusing has to be effected.

After the end of the optical scanning of the point P, the object 7, which here has a profile with depressions, is laterally displaced by a slide (not illustrated here) and the point Q in the depression of the object 7 is then optically scanned. Said point Q, too, yields a spatial short-coherence interferogram KKI with its modulation maximum generally only after repeated changing of the optical path length by delta L in the light source 111 having a frequency comb characteristic—in each case in a time interval delta_tz—on the line-scan detector 12. For this purpose, however—in comparison with traditional white light interferometry with a change in the optical path length in the sub-lambda range per detection—only a small number of changes in the optical path length by delta_L, that is to say only a small number of steps and recordings by means of the line-scan detector 12, are required in this case.

The invention claimed is:

1. An arrangement for robust interferometry or optical coherence tomography for detecting at least one of a distance, depth, profile, form, undulation, roughness, optical path length, and flatness deviation in or on technical or biological objects, including in layered form, the arrangement comprising:
   a light source for illuminating one of the technical or biological objects,
   an interferometer in the form of an interference microscope, having an object beam path and having at least one reference beam path, in which at least one end reflector is arranged, and a measurement plane in the object beam path, in which measurement plane the surface or volume elements of the object which are to be optically measured are at least approximately situated,
   and at least one line-scan detector for detecting electromagnetic radiation in the form of at least one spatial interferogram,
   at least one end reflector having three plane mirrors is arranged as reference reflector in the reference beam path of the interferometer, the three plane mirrors each being at least approximately perpendicular to a common reference plane BE, and
   three trace lines of planes represented by the surfaces of the three plane mirrors forming a triangle ABC in the reference plane BE, in order that there is a lateral shear of an absolute value delta_q between reference beam and object beam in said interferometer.

2. The arrangement for robust interferometry of claim 1, characterized in that the three trace lines form an obtuse triangle ABC in the reference plane BE.

3. The arrangement for robust interferometry of claim 1, characterized in that a multiplicity of miniaturized three-plane-mirror reference end reflectors define an array arranged in the reference beam path.

4. The arrangement for robust interferometry of claim 1, characterized in that the light source is a source of short-coherent electromagnetic radiation designed for laterally finely structured illumination of the object by a switchable spatial light modulator array.

5. The arrangement for robust interferometry of claim 1, further comprising at least one double diaphragm with slits or pinholes is arranged in a jointly used imaging stage for reference radiation and object radiation, wherein a first opening of the double diaphragm is reserved for the reference radiation and a second opening is reserved for the object radiation.

6. The arrangement for robust interferometry of claim 1, characterized in that means for chromatic depth splitting of foci are arranged in the object beam path.

7. The arrangement for robust interferometry of claim 1, characterized in that at least one confocally discriminating diagram is arranged in the object beam path.

8. The arrangement for robust interferometry of claim 1, characterized in that the interferometer is a Michelson, Linnik, Mirau or Schulz-Minor interferometer and at least one three-mirror reference end reflector is arranged in the reference beam path.

9. The arrangement for robust interferometry of claim 1, wherein
the light source is a monochromatic source of electromagnetic radiation, a quasi-monochromatic source of electromagnetic radiation, or a source of short-coherent electromagnetic radiation for illuminating the object, and
means for spectral splitting are arranged in the detection beam path.

10. A method for robust interferometry or optical coherence tomography for detecting at least one of a distance, depth, profile, form, undulation, roughness, and optical path length in or on technical or biological objects, including in layered form, comprising the following method steps:
generating at least one object beam of rays of electromagnetic radiation for illuminating the technical or biological objects,
generating at least one reference beam of rays by means of beam splitting in an interferometer,
generating spatial short-coherence interferences of object and reference rays,
detecting spatial short-coherence interferences on a line-scan detector of electromagnetic radiation,
directly carrying out successive reflections at three respective plane mirrors in the reference beam path,
the surfaces of said three plane mirrors each being at least approximately perpendicular to a common reference plane BE, thereby forming a three-plane-mirror reference end reflector,
introducing a lateral shear having an absolute value delta_q between object beam of rays and reference beam of rays in the interferometer, thereby generating at least one spatial short-coherence interferogram on the line-scan detector, and
evaluating at least one spatial interferogram to obtain information about at least one of the distance, depth, profile, form, undulation, roughness, and the optical path length of an object, including in optical coherence tomography.

11. The method for robust interferometry of claim 10, characterized in that a point illumination or a laterally structured illumination of the object is effected.

12. The method for robust interferometry of claim 10, characterized in that at least one three-plane-mirror reference end reflector is produced in a metal or plastics body by means of a single-point diamond processing technique.

13. The method for robust interferometry of claim 10, wherein a spectral splitting of object and reference radiation is carried out in the detection beam path, wherein the at least one spatial interferogram with spectral splitting is detected and evaluated in order to obtain information about at least one of the distance, depth, profile, form, undulation, roughness, and optical path length of an object.

14. An arrangement for robust, wide-scale interferometry or optical coherence tomography for detecting at least one of a distance, depth, profile, form, undulation, roughness, and optical path length in or on technical or biological objects, including in layered form, which comprises the following means:
at least one source of short-coherent electromagnetic radiation for illuminating the technical or biological object, comprising a frequency comb laser cavity disposed upstream of the interferometer and having a single optical length L and at least one multi-beam interference cavity disposed downstream of a spectrally broadband source in the light path and having the single optical length L,
an interferometer having an object beam path and having at least one reference beam path, in which at least one end reflector having three plane mirrors as reference reflector is arranged, wherein the surfaces of said three plane mirrors lie in each case at least approximately perpendicular to a common reference plane BE and wherein the three trace lines of the planes which are represented by the surfaces of the three plane mirrors form a triangle ABC in the reference plane BE, in order that there is a lateral shear of the absolute value delta_q between reference beam and object beam in said interferometer, and having a measurement plane or a measurement volume in the object beam path, in which the surface or volume elements of the technical or biological object which are to be optically measured are at least approximately situated,
and at least one line-scan detector for detecting electromagnetic radiation, and
means for tuning the frequency comb laser cavity and the multi-beam interference cavity.

15. The arrangement for robust interferometry of claim 14, characterized in that there are arranged means for temporal synchronization for carrying out an optical length change delta_L of at least one frequency comb laser cavity disposed upstream of the interferometer and of at least one multi-beam interference cavity disposed downstream of the source in the light path with the image recording by means of line-scan detector.

* * * * *